(12) United States Patent
Ye et al.

(10) Patent No.: US 9,344,475 B2
(45) Date of Patent: May 17, 2016

(54) MEDIA TRANSMISSION METHOD AND SYSTEM BASED ON TELEPRESENCE

(75) Inventors: Xiaoyang Ye, Shenzhen (CN); Bo Sun, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 247 days.

(21) Appl. No.: 14/130,264

(22) PCT Filed: Mar. 21, 2012

(86) PCT No.: PCT/CN2012/072739
§ 371 (c)(1),
(2), (4) Date: Dec. 30, 2013

(87) PCT Pub. No.: WO2012/155659
PCT Pub. Date: Nov. 22, 2012

(65) Prior Publication Data
US 2014/0139618 A1    May 22, 2014

(30) Foreign Application Priority Data

Jul. 8, 2011   (CN) .......................... 2011 1 0191518

(51) Int. Cl.
*H04N 7/14*     (2006.01)
*H04L 29/06*    (2006.01)
*H04N 7/15*     (2006.01)

(52) U.S. Cl.
CPC .......... *H04L 65/605* (2013.01); *H04L 65/1069* (2013.01); *H04L 65/403* (2013.01); *H04N 7/147* (2013.01); *H04N 7/15* (2013.01); *H04N 7/152* (2013.01)

(58) Field of Classification Search
CPC ....................................................... H04N 7/14
USPC .......... 348/14.01, 14.08, 14.11, 14.12, 14.13, 348/14.09
See application file for complete search history.

(56) References Cited

U.S. PATENT DOCUMENTS

2009/0207234 A1*  8/2009  Chen .................. H04N 5/23238
                                                       348/14.09
2010/0149309 A1*  6/2010  Hagen .................... H04N 7/144
                                                       348/14.12

(Continued)

FOREIGN PATENT DOCUMENTS

CN          101198008 A     6/2008
CN          101534413 A     9/2009

(Continued)

OTHER PUBLICATIONS

International Search Report in international application No. PCT/CN2012/072739 , mailed on Jun. 28, 2012.
English Translation of the Written Opinion of the International Search Authority in international application No. PCT/CN2012/072739 , mailed on Jun. 28, 2012.

(Continued)

*Primary Examiner* — Olisa Anwah
(74) *Attorney, Agent, or Firm* — Oppedahl Patent Law Firm LLC

(57) ABSTRACT

A media transmission method based on telepresence is disclosed, comprising: during connection establishment, a master telepresence terminal of a local media transmission system and a remote endpoint perform signaling exchange, to establish a media logical channel between the local media transmission system and the remote endpoint; and transmits the same type of media streams between the local media transmission system and the remote endpoint through a media logical channel or respectively through multiple media logical channels, and receives the same type of media streams through a media logical channel or respectively through multiple media logical channels. A media transmission system based on telepresence is further disclosed correspondingly. Through the disclosure, when a telepresence system of a certain conference site is called, only one number needs to be called, which is easy to operate; moreover, agent information exchange can be performed in the telepresence system, thereby achieving the effect of sound-based localization, solving the problem such as synchronization between streams, and improving user experience.

14 Claims, 15 Drawing Sheets

(56) References Cited

U.S. PATENT DOCUMENTS

| | | |
|---|---|---|
| 2010/0268541 A1 | 10/2010 | Li |
| 2011/0032324 A1 | 2/2011 | George |
| 2011/0261151 A1* | 10/2011 | Wang ............... H04L 12/1827 348/14.09 |
| 2012/0033030 A1 | 2/2012 | Liu |
| 2012/0200658 A1* | 8/2012 | Duckworth ............ H04N 7/152 348/14.07 |
| 2013/0064387 A1 | 3/2013 | Li |
| 2013/0242037 A1 | 9/2013 | George et al. |

FOREIGN PATENT DOCUMENTS

| | | |
|---|---|---|
| CN | 101668160 A | 3/2010 |
| EP | 2216941 A1 | 8/2010 |
| EP | 2285068 A1 | 2/2011 |

OTHER PUBLICATIONS

Supplementary European Search Report in European application No. 12785453.7, mailed on Feb. 26, 2015.

* cited by examiner

MEDIA TRANSMISSION METHOD AND SYSTEM BASED ON TELEPRESENCE

TECHNICAL FIELD

The disclosure relates to telepresence technology, and in particular to a media transmission method and system based on telepresence.

BACKGROUND

Telepresence is an advanced remote video conference system, which has been favoured by high-end users for the actual presence of the telepresence. In a telepresence system, sound-based localization, life-size, and eye contact are directly related to whether a user can have an immersive feeling and therefore they are very important technical indicators for measuring the telepresence system.

In a conventional video conference system, each conference site has only one video conference terminal, the video conference terminal encodes and transmits at least an audio or a video, and receives, decodes and outputs at least an audio or a video besides a secondary stream video. Since there is only one input source and output of a sound, the user cannot perceive the direction from which a sound is emitted in the conference site. Moreover, since there is only one input source and output source of the video, an captured and encoded pictures of a local end need to cover an overall picture of the conference site. In the case of a multipoint conference, pictures of only one conference site or stitched pictures of a plurality of remote conference sites can be selected for displaying, thereby the video transmitted or received cannot meet the requirement for displaying a life-size object.

In a telepresence conference system, a single conference site may have at least a plurality of audio or video input and output devices and in a multi-screen conference site, each screen displays pictures of agent participants in one position, correspondingly the agent participants in every position correspond to one audio input. By means of the azimuth information of the audio and the directional regional acquisition of a professional camera, sound-based localization and life-size displaying can be achieved, and realistic effect of eye contact can further be achieved.

However, existing telepresence systems are typically evolved from conventional video conference systems, and a multi-screen conference site is comprised of a plurality of video conference terminals and a plurality of audio-video peripheral devices. A plurality of video conference terminals of a conference site establish signaling connections and media logical channels with remote endpoints (may be video conference terminals or multipoint control units (MCUs)) respectively, finally transferring audio-video streams between pairs of endpoints and outputting a plurality of streams through a loudspeaker box and a display device which are separated with each other. This operation manner is cumbersome, and a plurality of video conference terminals are required in one conference site for processing signalings, and each terminal occupies an IP address, or an endpoint ID number (such as H.323 ID), or a conference number respectively, lacking a mechanism for mutual information processing between the terminals (such as agent information), and the synchronization between multiple streams is very difficult, which affects user experience.

SUMMARY

In view of the above, the main purpose of the disclosure is to provide a media transmission method and system based on telepresence, which is simple to operate and improves user experience.

In order to achieve this purpose, the technical solutions of embodiments of the disclosure are accomplished by:

a media transmission method based on telepresence, a media transmission system includes a master telepresence terminal and at least one secondary telepresence terminal, the method includes:

during connection establishment, a master telepresence terminal of a local media transmission system and a remote endpoint perform signaling exchange, to establish media logical channels between the local media transmission system and the remote endpoint;

transmits, by the local media transmission system, the same type of media streams to the remote endpoint through a media logical channel or respectively through multiple media logical channels, and receiving the same type of media streams through a media logical channel or respectively through multiple media logical channels from the remote endpoint.

The establishing media logical channel between the local media transmission system and the remote endpoint may be: respectively establishing media logical channels for transmitting media streams between media transmission modules of each local telepresence terminal and the remote endpoint, and recording information of correspondence between each media logical channel and position(s) of each audio input device and/or video input device;

the transmitting the same type of media streams respectively through multiple media logical channels from the local media transmission system to the remote endpoint may be: at least the audio input device or video input device transmits captured audio and/or video data to the media encoding and decoding module of the telepresence terminal at corresponding position for encoding; the media encoding and decoding module of each telepresnece terminal respectively encodes inputted audio and/or video data, and forwards the encoded media streams to corresponding media transmission module; the media transmission module of each telepresence terminal respectively transmits the encoded media streams to the remote endpoint through the media logical channel corresponding to the type and position of a media source.

The establishing a media logical channel between the local media transmission system and the remote endpoint may be: respectively establishing media logical channels for receiving media streams between the media transmission module of each local telepresence terminal and the remote endpoint, and recording information of correspondence between each media logical channel and position(s) of each audio input device and/or video input device;

the receiving the same type of media streams by the local media transmission system from the remote endpoint respectively through multiple media logical channels may be: the media transmission module of each telepresence terminal each receives remote multiple media streams through the established media logical channel, and respectively forwards the media streams to corresponding media encoding and decoding modules for processing according to a correspondence relationship between each media logical channel and a position of each audio input device or video input device; the media encoding and decoding module of each telepresence terminal respectively decodes the received media streams, and then the media streams are output to corresponding audio output device and/or the video output device for playing.

The establishing a media logical channel between the local media transmission system and the remote endpoint may be: establishing multiple media logical channels for transmitting media streams between the media transmission module of the master telepresence terminal and the remote endpoint, and recording information of correspondence between each media logical channel and position(s) of each audio input device and/or video input device;

the transmitting the same type of media streams between the local media transmission system and the remote endpoint respectively through multiple media logical channels may be: at least the audio input device or video input device transmits captured audio and/or video data to the media encoding and decoding module of the telepresence terminal at corresponding position; each media encoding and decoding module encodes the inputted audio and/or video data respectively, and forwards the encoded media streams to the media transmission module of the master telepresence terminal; the media transmission module of the master telepresence terminal respectively transmits the media streams encoded by the local media encoding and decoding module to the remote endpoint through the media logical channel corresponding to the type and position of a media source.

The establishing a media logical channel between the local media transmission system and the remote endpoint may be: establishing multiple media logical channels for receiving media streams between the media transmission module of the master telepresence terminal and the remote endpoint, and recording information of correspondence between each media logical channel and position(s) of each audio input device and/or video input device;

the receiving the same type of media streams between the local media transmission system and the remote endpoint respectively through multiple media logical channels may be: the media transmission module of the master telepresence terminal receives remote multiple media streams respectively through each established media logical channel, and respectively forwards the received media streams to the media encoding and decoding module of corresponding telepresence terminal for processing according to a correspondence relationship between each media logical channel and a position of each audio input device or video input device; the media encoding and decoding module of each telepresence terminal decodes the received audio and/or video streams respectively, and then the streams are output to corresponding audio output device and/or video output device for playing.

The establishing a media logical channel between the local media transmission system and the remote endpoint may be: establishing a media logical channel for transmitting media streams for each media type between the media transmission module of the master telepresence terminal and the remote endpoint, and recording media types and positions of the local audio input device and/or the video input device;

the transmitting the same type of media streams between the local media transmission system and the remote endpoint through a media logical channel may be: at least the audio input device or video input device transmits captured audio or video data to the media encoding and decoding module of the telepresence terminal at corresponding position; each media encoding and decoding module encodes inputted audio and/or video data respectively, and forwards the encoded media streams to the media transmission module of the master telepresence terminal; the media transmission module of the master telepresence terminal transmits the encoded media streams through the media logical channel between the master telepresence terminal and the remote endpoint, corresponding media type and position information are included in a header of a media package transmitted.

The establishing a media logical channel between the local media transmission system and the remote endpoint may be: establishing a media logical channel for receiving media streams for each media type between the media transmission module of the master telepresence terminal and the remote endpoint, and recording media types and positions of a local audio output device and/or video output device;

the receiving the same type of media streams between the local media transmission system and the remote endpoint through a media logical channel may be: the media transmission module of the master telepresence terminal receives the remote media streams from the media logical channel, and forwards the media streams to the media encoding and decoding module of corresponding telepresence terminal for processing by analyzing the media type and position information identified by the header of a package; the media encoding and decoding module of each telepresence terminal decodes the received audio and/or video streams respectively, and then the streams are output to corresponding audio output device and/or video output device for playing.

The media logical channel may be distinguished by an IP address and a port number, at least IP addresses or port numbers to which different media logical channels correspond may be different.

A media transmission system based on telepresence including a master telepresence terminal and at least one secondary telepresence terminals; wherein, the master telepresence terminal is configured to, during connection establishment between the media transmission system and a remote endpoint, perform signaling exchange with the remote endpoint, to establish media logical channels between the media transmission system and the remote endpoint; and transmit the same type of media streams through an established media logical channel or respectively through multiple media logical channels, and receive the same type of media streams through an established media logical channel or respectively through multiple media logical channels;

the secondary telepresence terminal is configured to transmit and receive media streams through the media logical channel established by the master telepresnece terminal.

The system may further include a multi audio input device and/or video input device, the master telepresence terminal may at least include: a signalling processing module, a media encoding and decoding module, a media transmission module, the secondary telepresence terminal may at least include: a media encoding and decoding module, and a media transmission module; wherein the signaling processing module is configured to be responsible for signalling exchange and implementing media capability negotiation, to respectively establish the media logical channel for transmitting media streams between the media transmission module of each telepresence terminal and the remote endpoint in the system, and record information of correspondence between each media logical channel and position(s) of each audio input device and/or video input device;

at least the audio input device or the video input device may be configured to transmit captured audio and/or video data to the media encoding and decoding module of the telepresence terminal at corresponding position for encoding;

the media encoding and decoding module may be configured to encode the inputted audio and/or video data, and forward the encoded media streams to corresponding media transmission module;

the media transmission module may be configured to transmit the media streams encoded by the media encoding and decoding module to the remote endpoint through the media logical channel corresponding to the type and position of a media source.

The system may further include a multi audio output device and/or video output device, the master telepresence terminal may at least include: a signalling processing module, a media encoding and decoding module, a media transmission module, the secondary telepresence terminal may at least include: a media encoding and decoding module, and a media transmission module; wherein the signaling processing module may be configured to be responsible for signalling exchange and implementing media capability negotiation, to respectively establish the media logical channel for receiving media streams between the media transmission module of each telepresence terminal and the remote endpoint in the system, and record information of correspondence between each media logical channel and position(s) of each audio input device and/or video input device;

the media transmission module may be configured to receive remote media streams through the established media logical channel, and respectively forward the media streams to corresponding media encoding and decoding module for processing according to a correspondence relationship between each media logical channel and a position of each audio input device or video input device;

the media encoding and decoding module may be configured to decode the received media streams, then the media streams are output to corresponding audio output device and/or video output device for playing.

The system may further include a multiple audio input device and/or video input device, the master telepresence terminal may at least include: a signalling processing module, a media encoding and decoding module, a media transmission module, the secondary telepresence terminal may at least include: a media encoding and decoding module, and a media transmission module; wherein, the signalling processing module may be configured to be responsible for signalling exchange and implementing media capability negotiation, to establish multiple media logical channels for transmitting media streams between the media transmission module of the master telepresence terminal and the remote endpoint, and record information of correspondence between each media logical channel and position(s) of each audio input device and/or video input device;

at least the audio input device or video input device may be configured to transmit captured audio and/or video data to the media encoding and decoding module of the telepresence terminal at corresponding position;

the media encoding and decoding module is configured to encode the inputted audio and/or video data, and forward the encoded media streams to the media transmission module of the master telepresence terminal, wherein the media encoding and decoding module of the secondary telepresence terminal forwards the encoded media streams to the media transmission module of the master telepresence terminal through corresponding media transmission module, the media encoding and decoding module of the master telepresence terminal forwards the encoded media streams directly to the media transmission module of the master telepresence terminal;

the media transmission module of the master telepresence terminal may be configured to respectively transmit media streams encoded by each media encoding and decoding module in the system to the remote endpoint through the media logical channel corresponding to the type and position of a media source.

The system may further include a multiple audio output device and/or video output device, the master telepresence terminal may at least include: a signalling processing module, a media encoding and decoding module, a media transmission module, the secondary telepresence terminal may at least include: a media encoding and decoding module, and a media transmission module; wherein, the signaling processing module may be configured to be responsible for signalling exchange and implementing media capability negotiation, to establish multiple media logical channels for receiving media streams between the media transmission module of the master telepresence terminal and the remote endpoint, and record information of correspondence between each media logical channel and position(s) of each audio input device and/or video input device;

the media transmission module of the master telepresence terminal may be configured to respectively receive remote multiple media streams through each established media logical channel, and respectively forward the received media streams to the media encoding and decoding module of corresponding telepresence terminal for processing according to a correspondence relationship between each media logical channel and a position of each audio input device or video input device, wherein the media streams are forwarded directly to the media encoding and decoding module of the master telepresence terminal, and forwarded to the media encoding and decoding module of the secondary telepresence terminal by corresponding media transmission module;

the media encoding and decoding module may be configured to decode the received audio and/or video streams, and then the streams are output to corresponding audio output device and/or video output device for playing.

The system may further include a multiple audio input device and/or video input device, the master telepresence terminal may at least include: a signalling processing module, a media encoding and decoding module, a media transmission module, the secondary telepresence terminal may at least include: a media encoding and decoding module, and a media transmission module; wherein, the signaling processing module may be configured to be responsible for signalling exchange and implementing media capability negotiation, to establish a media logical channel for transmitting media streams for each media type between the media transmission module of the master telepresence terminal and the remote endpoint, and record media types and positions of the local audio input device and/or video input device;

at least the audio input device or video input device may be configured to transmit captured audio and/or video data to the media encoding and decoding module of the telepresence terminal at corresponding position;

the media encoding and decoding module may be configured to encode the inputted audio and/or video data, the media encoding and decoding module of the master telepresence terminal forwards the encoded media streams to corresponding media transmission module, the media encoding and decoding module of the secondary telepresence terminal forwards the encoded media streams to the media transmission module of the master telepresence terminal by corresponding media transmission module;

the terminal transmission module of the master telepresence terminal may be configured to transmit the received encoded media streams through the media logical channel between the master telepresence terminal and the remote endpoint, corresponding media type and position information are included in a header of a media package transmitted.

The system may further include a multiple audio output device and/or video output device, the master telepresence terminal may at least include: a signalling processing module, a media encoding and decoding module, a media transmission module, the secondary telepresence terminal may at least include: a media encoding and decoding module, and a media transmission module; wherein, the signaling processing module may be configured to be responsible for signalling exchange and implementing media capability negotiation, to establish a media logical channel for receiving for each media type between the media transmission module of the master telepresence terminal and the remote endpoint, and record media types and positions of the local audio output device and/or video output device;

the media transmission module of the master telepresence terminal may be configured to receive remote media streams from the media logical channel, forward the media streams to the media encoding and decoding module of corresponding telepresence terminal for processing by analyzing the media type and position information identified by a header, wherein the media streams are forwarded directly to the media encoding and decoding module of the master telepresence terminal, and forwarded to the media encoding and decoding module of the secondary telepresence terminal by corresponding media transmission module;

the media encoding and decoding module may be configured to decode the received audio and/or video streams, and then the streams are output to corresponding audio output device and/or video output device for playing.

The media logical channel may be distinguished by an IP address and a port number, at least IP addresses or port numbers to which different media logical channels correspond may be different.

In a media transmission method and system based on telepresence in the embodiments of the disclosure, during connection establishment, a master telepresence terminal of a local media transmission system and a remote endpoint perform signaling exchange, to establish a media logical channel between the local media transmission system and the remote endpoint; and media is transferred between the local media transmission system and the remote endpoint through multiple media logical channels or through a media logical channel. Through the disclosure, when a telepresence system of a certain conference site is called, only one number needs to be called (an IP address, or an ID number of an endpoint, or a conference number), which is easy to operate; moreover, agent information exchange can be performed in the telepresence system, thereby achieving the effect of sound-based localization, solving the problem such as synchronization between streams, and improving user experience.

DETAILED DESCRIPTION

The basic idea of the disclosure is that, during connection establishment, a master telepresence terminal of a local media transmission system and a remote endpoint perform signaling exchange, to establish a media logical channel between the local media transmission system and the remote endpoint; the media is transferred between the local media transmission system and the remote endpoint through multiple media logical channels or through a media logical channel.

Figure 1:
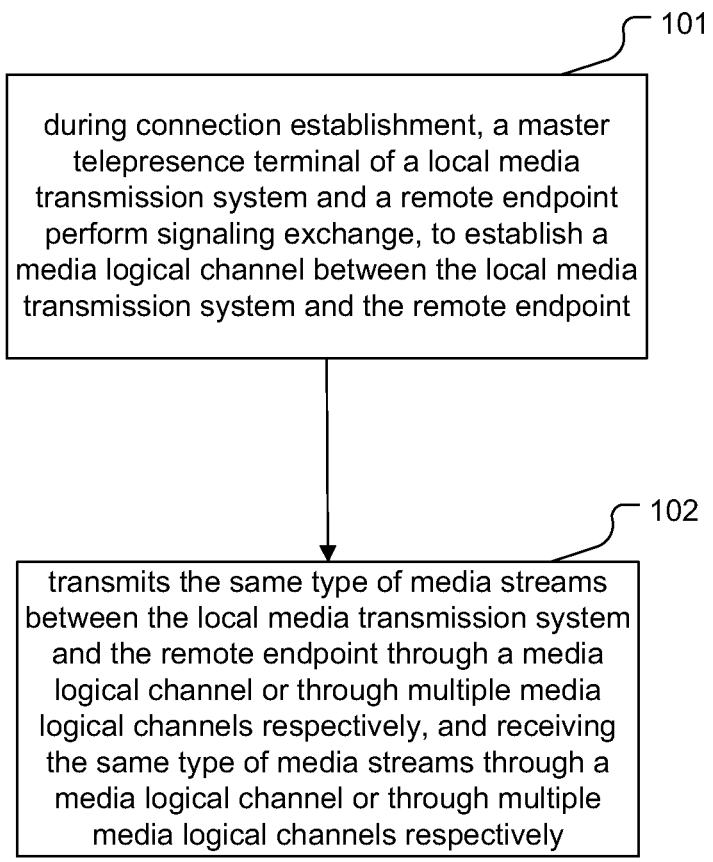
FIG. 1 is a schematic flow diagram of a media transmission method based on telepresence according to an embodiment of the disclosure.

FIG. 1 is a schematic flow diagram of a media transmission method based on telepresence according to an embodiment of the disclosure, as shown in FIG. 1, the method includes:

Step 101: during connection establishment, a master telepresence terminal of a local media transmission system and a remote endpoint perform signaling exchange, to establish a media logical channel between the local media transmission system and the remote endpoint.

It should be noted that, during the process in which a master telepresence terminal and a remote endpoint perform signaling exchange, the number of telepresence terminal audio-video input and output device on both sides, position information and media type of a telepresence terminal are generally required to be exchanged. In practice, it is not required that the exchange massages should include respectively each kind of the information described above, wherein some information can be inferred from other information, for example, the messages transmitted by a master telepresence terminal to a remote endpoint including the information indicating that the telepresence system has a left video, a middle video and a right video, then the remote endpoint may further learn that the telepresence system has three video input devices.

During the process in which a master telepresence terminal and a remote endpoint perform signaling exchange, according to position information of an audio input device, audio output device, video input device and/or video output device, a mapping relationship between a desired channel with a media type (such as audio, video) and a position (such as left, middle, right) is created and the mapping relationship is exchanged.

It should be noted that, when the media logical channel is established and opened, the master telepresence terminal needs to record a corresponding relationship between a media type and position information and media logical channel identification.

Step 102: transmits the same type of media streams between the local media transmission system and the remote endpoint through a media logical channel or through multiple media logical channels respectively, and receiving the same type of media streams through a media logical channel or through multiple media logical channels respectively.

The technical solutions of the disclosure are further explained in more detail below by way of specific embodiments.

Embodiment 1

Figure 2:
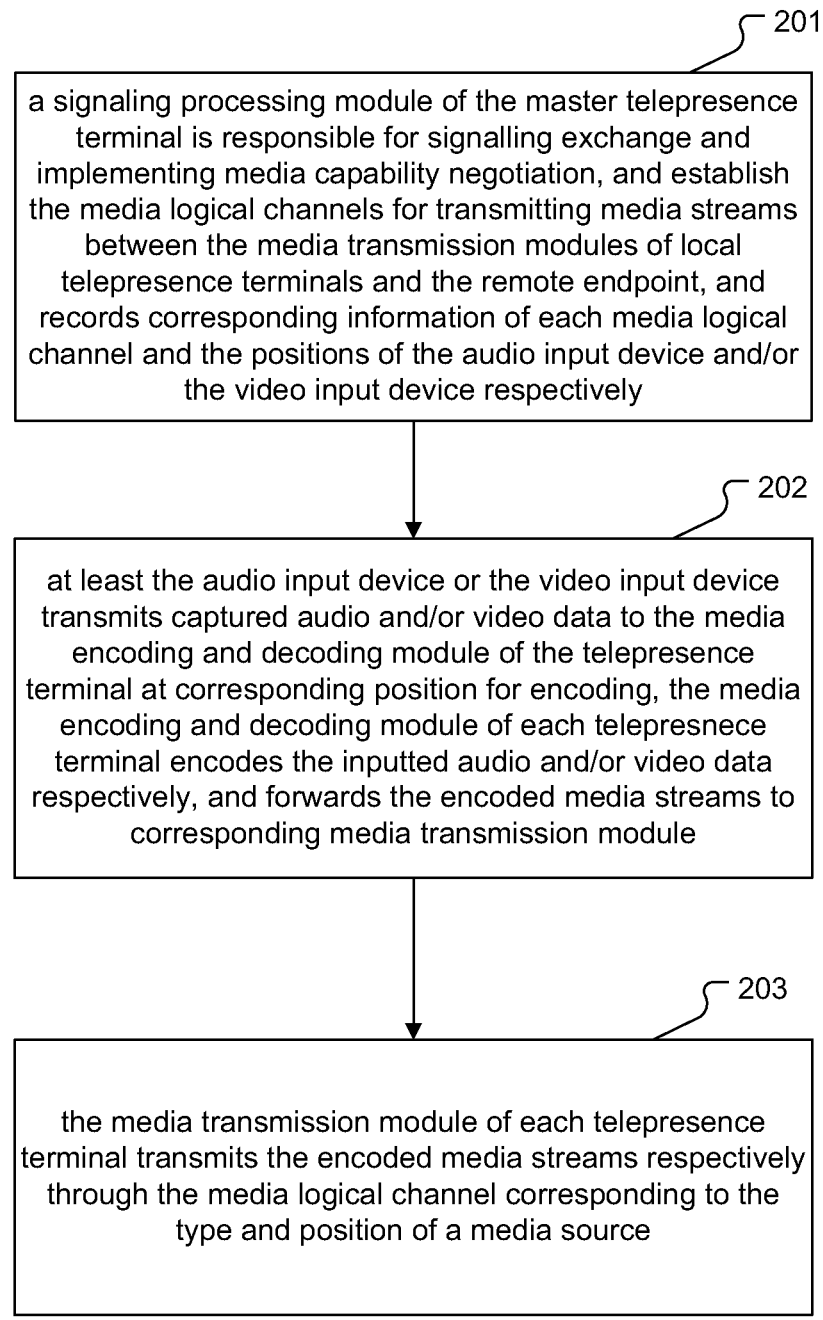
FIG. 2 is a schematic flow diagram illustrating that the media transmission implemented by a media transmission system based on telepresence through multiple media logical channels according to embodiment 1 of the disclosure.

FIG. 2 is a schematic flow diagram illustrating a media transmission implemented by the media transmission system based on telepresence through multiple media logical channels according to embodiment 1 of the disclosure, as shown in FIG. 2, the method includes:

Step 201: the master telepresence terminal establishes a call between local side and a remote endpoint, a signaling processing module of the master telepresence terminal is responsible for signaling exchange, and implements media capability negotiation and establishes the media logical channels for transmitting media streams between the media transmission modules of local telepresence terminals and the remote endpoint, and records information of correspondence between each media logical channel and position(s) of each audio input device and/or video input device respectively.

Step 202: at least the audio input device or the video input device transmits captured audio and/or video data to the media encoding and decoding module of the telepresence terminal at corresponding position for encoding, the media encoding and decoding module of each telepresence terminal encodes the inputted audio and/or video data respectively, and forwards the encoded media streams to corresponding media transmission module.

Step 203: the media transmission module of each telepresence terminal transmits the encoded media streams respectively through the media logical channel corresponding to the type and position of a media source, i.e. transmits to the remote endpoint through the media logical channels corresponding to the positions of the audio input device and/or the video input device.

Embodiment 2

Figure 3:
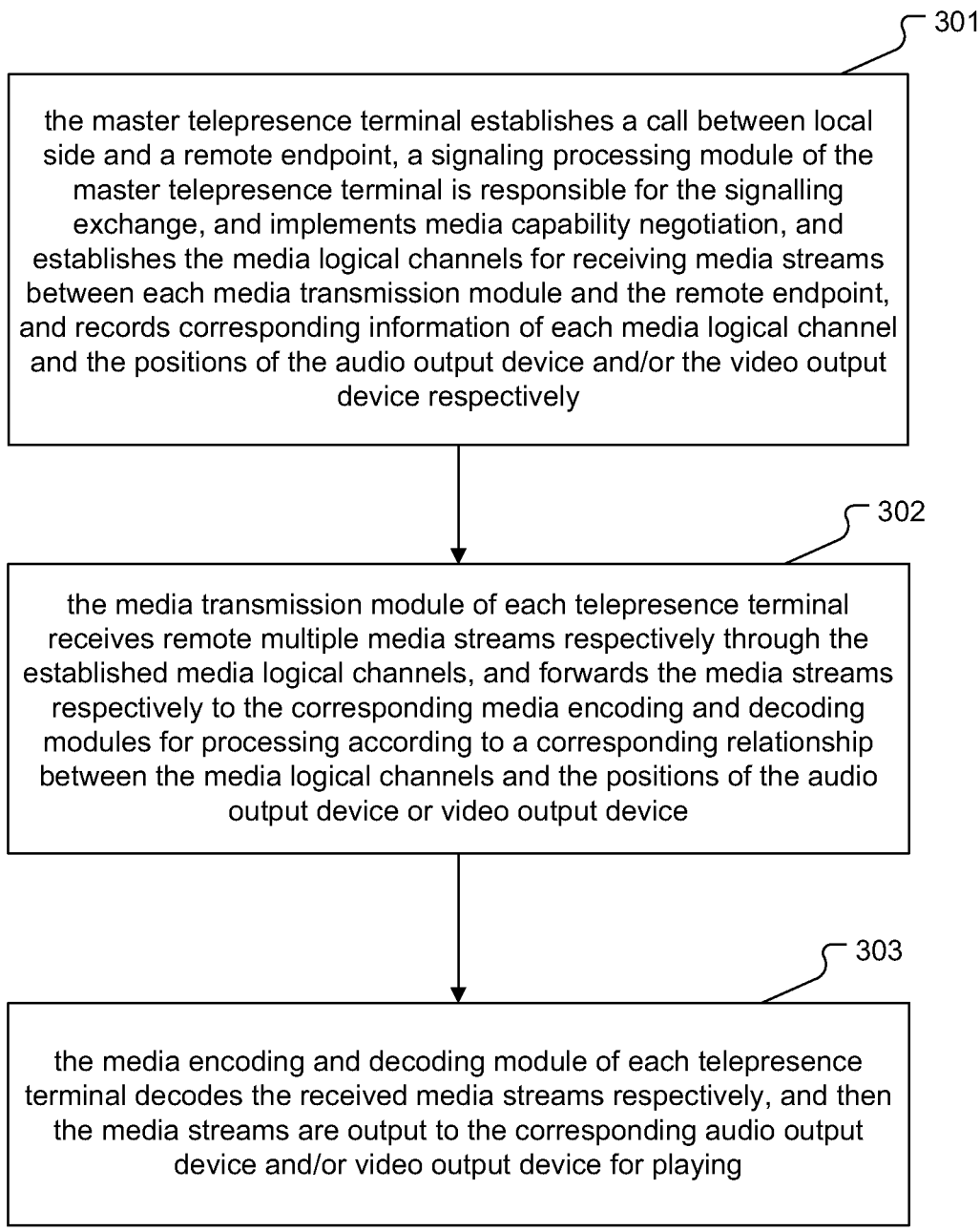
FIG. 3 is a schematic flow diagram illustrating that the media reception implemented by a media transmission system based on telepresence through multiple media logical channels according to embodiment 2 of the disclosure.

FIG. 3 is a schematic flow diagram illustrating the media reception implemented by a media transmission system based on telepresence through multiple media logical channels according to embodiment 2 of the disclosure, as shown in FIG. 3, the method includes:

Step 301: the master telepresence terminal establishes a call between local side and a remote endpoint, a signaling processing module of the master telepresence terminal is responsible for signaling exchange, and implements media capability negotiation and establishes the media logical channels for receiving media streams between each media transmission module and the remote endpoint, and records information of correspondence between each media logical channel and position(s) of each audio input device and/or video input device respectively.

Step 302: the media transmission module of each telepresence terminal receives remote multiple media streams respectively through the established media logical channels, and forwards the media streams respectively to the corresponding media encoding and decoding module for processing according to a corresponding relationship between the media logical channels and the positions of the audio output device or video output device.

Step 303: the media encoding and decoding module of each telepresence terminal decodes the received media streams respectively, and then the media streams are output to the corresponding audio output device and/or video output device for playing.

Embodiment 3

Figure 4:
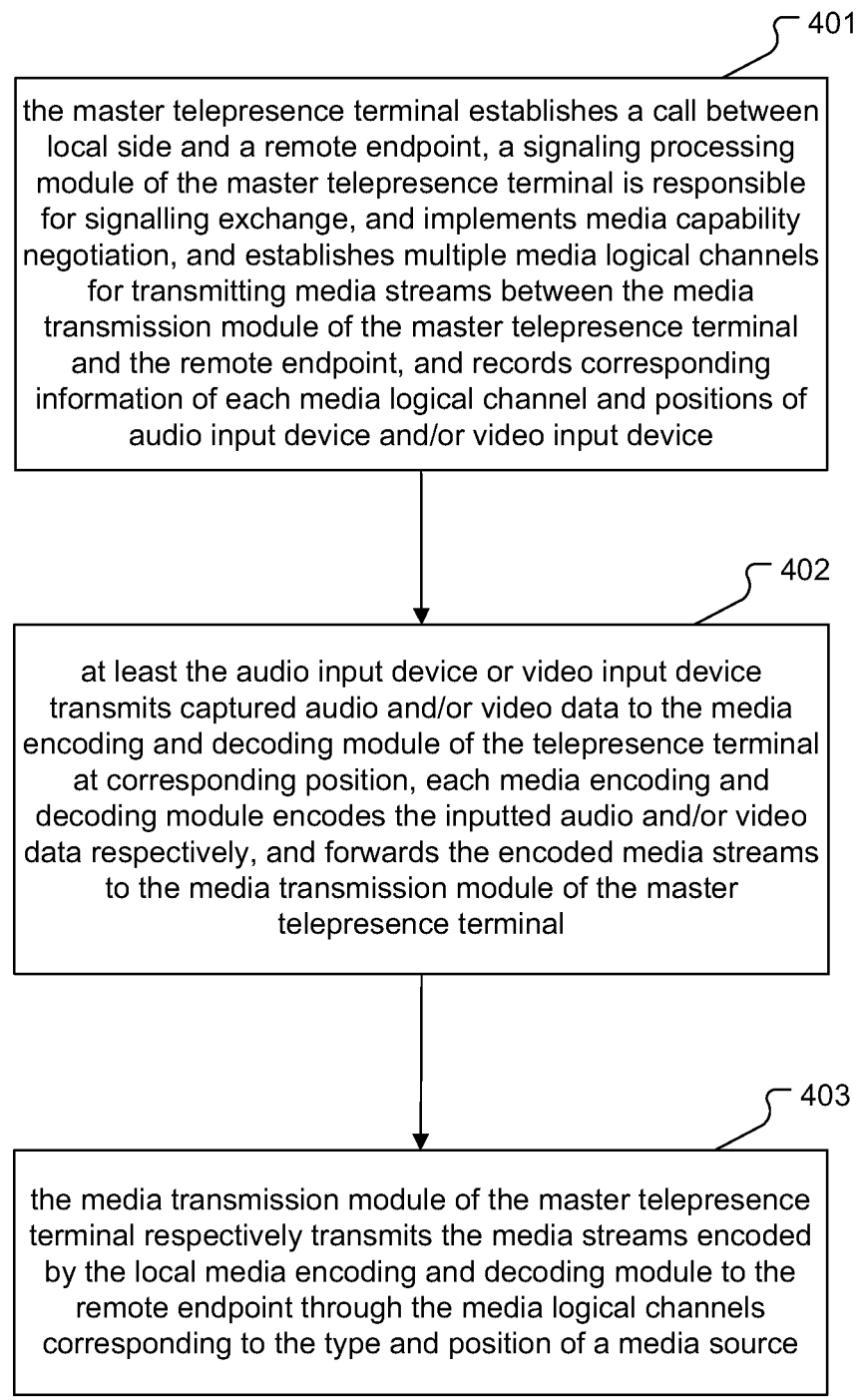
FIG. 4 is a schematic flow diagram illustrating that the media transmission implemented by a media transmission system based on telepresence through multiple media logical channels according to embodiment 3 of the disclosure.

FIG. 4 is a schematic flow diagram illustrating the media transmission implemented by a media transmission system based on telepresence through multiple media logical channels according to embodiment 3 of the disclosure, as shown in FIG. 4, the method includes:

Step 401: the master telepresence terminal establishes a call between local side and a remote endpoint, a signaling processing module of the master telepresence terminal is responsible for signaling exchange, and implements media capability negotiation, establishes multiple media logical channels for transmitting media streams between the media transmission module of the master telepresence terminal and the remote endpoint, and records information of correspondence between each media logical channel and position(s) of each audio input device and/or video input device.

Step 402: at least the audio input device or the video input device transmits captured audio and/or video data to the media encoding and decoding module of the telepresence terminal at corresponding position, each media encoding and decoding module encodes the inputted audio and/or video data respectively, and forwards the encoded media streams to the media transmission module of the master telepresence terminal.

It should be noted that, the media encoding and decoding module of the master telepresence terminal directly forwards the encoded media streams to the media transmission module of the master telepresence terminal, a media encoding and decoding module of a secondary telepresence terminal forwards encoded media streams to the media transmission module of the master telepresence terminal through corresponding media transmission module.

Step 403: the media transmission module of the master telepresence terminal respectively transmits the media streams encoded by the local media encoding and decoding module to the remote endpoint through the media logical channels corresponding to the type and position of a media source (the positions of the audio input device and the video input device).

Embodiment 4

Figure 5:
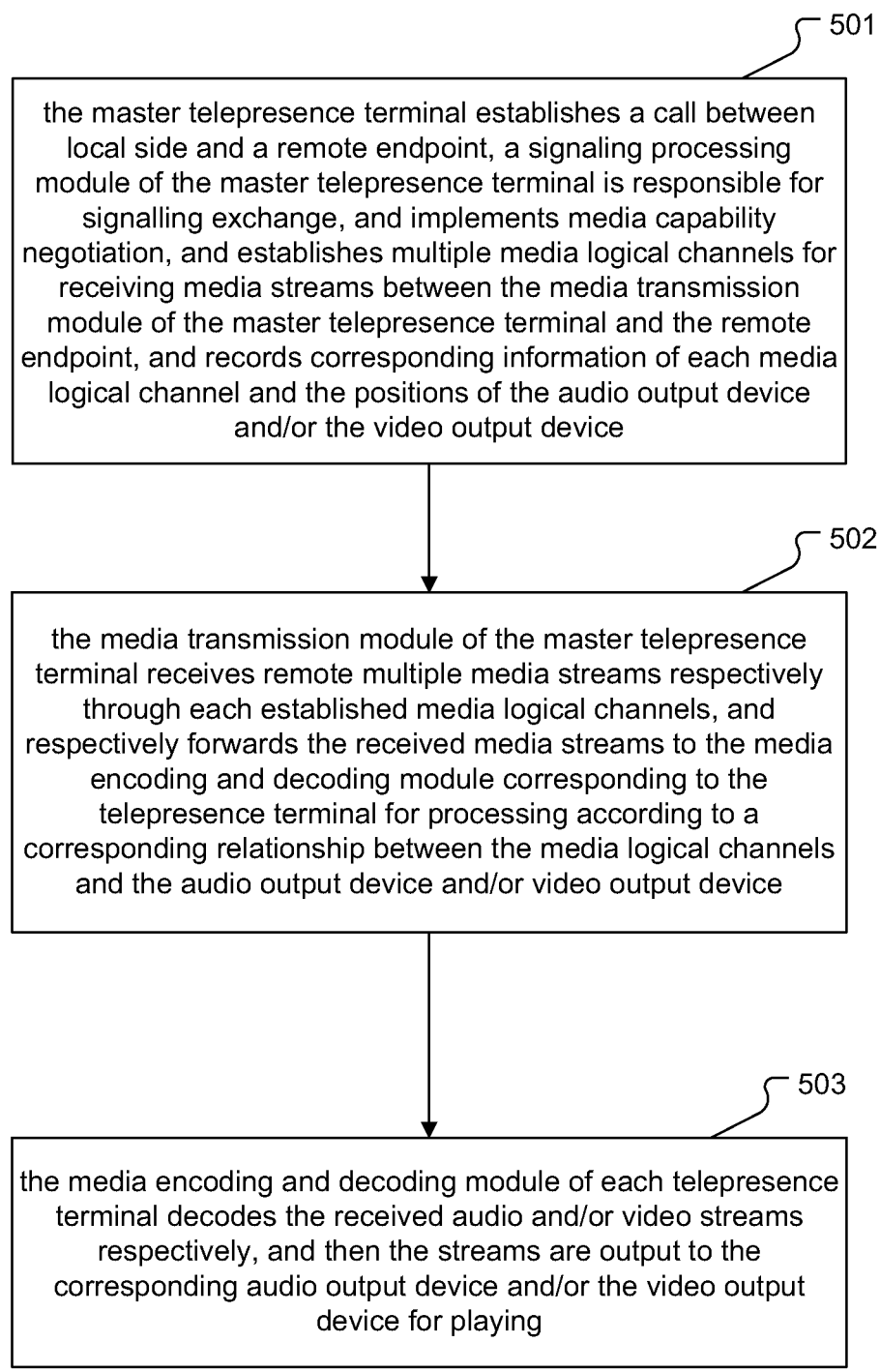
FIG. 5 is a schematic flow diagram illustrating that the media reception implemented by a media transmission system based on telepresence through multiple media logical channels according to embodiment 4 of the disclosure.

FIG. 5 is a schematic flow diagram illustrating the media reception implemented by a media transmission system based on telepresence through multiple media logical channels according to embodiment 4 of the disclosure, as shown in FIG. 5, the method includes:

Step 501: the master telepresence terminal establishes a call between local side and a remote endpoint, a signaling processing module of the master telepresence terminal is responsible for signaling exchange, and implements media capability negotiation, establishes multiple media logical channels for receiving media streams between the media transmission module of the master telepresence terminal and the remote endpoint, and records information of correspondence between each media logical channel and position(s) of each audio input device and/or video input device.

Step 502: the media transmission module of the master telepresence terminal receives remote multiple media streams respectively through each established media logical channels, and respectively forwards the received media streams to the media encoding and decoding module corresponding to the telepresence terminal for processing according to a corresponding relationship between the media logical channels and the audio output device and/or the video output device.

It should be noted that, the media transmission module of the master telepresence terminal directly forwards the media streams to the media encoding and decoding module of the master telepresence terminal, and forwards the media streams to a media encoding and decoding module of a secondary telepresence terminal through the media transmission module of the secondary telepresence terminal.

Step 503: the media encoding and decoding module of each telepresence terminal decodes the received audio and/or video streams respectively, and then the streams are output to the corresponding audio output device and/or the video output device for playing.

Embodiment 5

Figure 6:
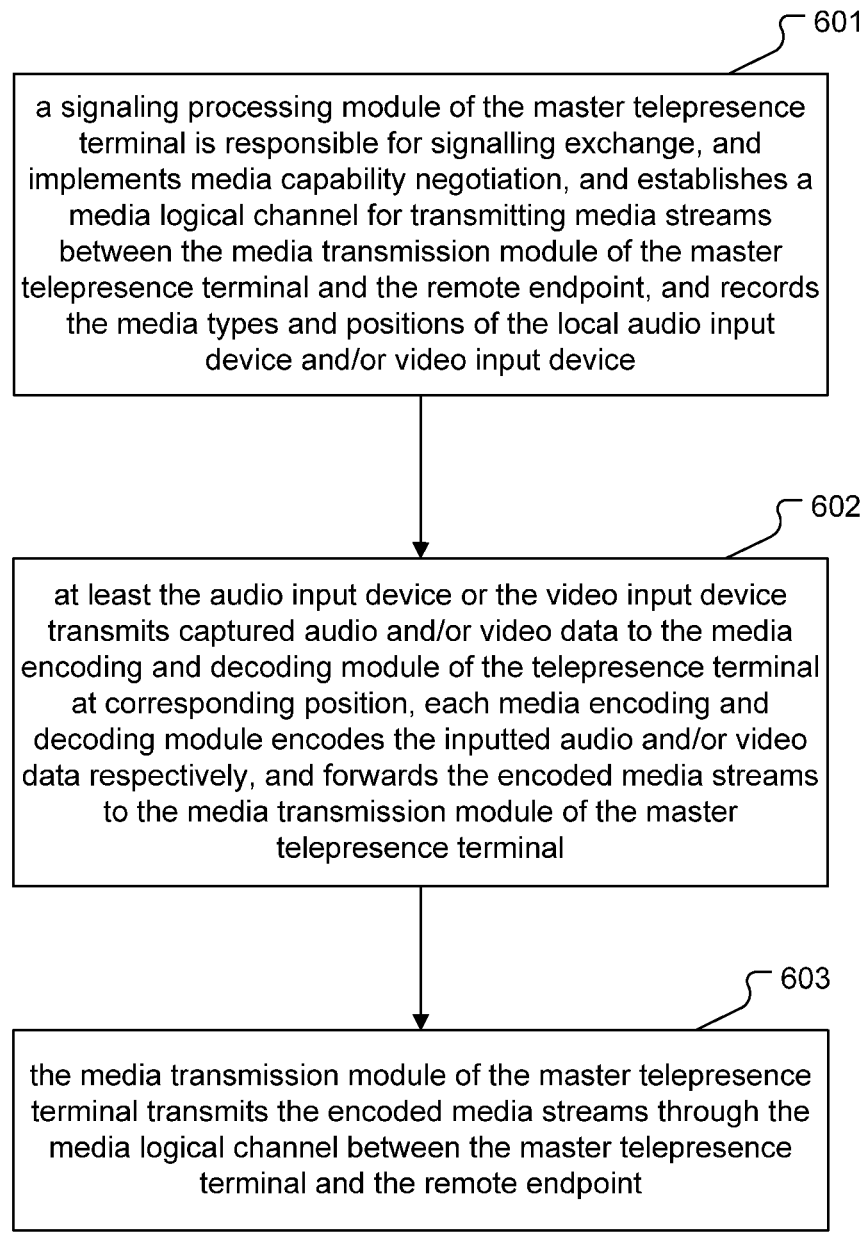
FIG. 6 is a schematic flow diagram illustrating that the media transmission implemented by a media transmission system based on telepresence through a media logical channel according to embodiment 5 of the disclosure.

FIG. 6 is a schematic flow diagram illustrating the media transmission implemented by a media transmission system based on telepresence through a media logical channel according to embodiment 5 of the disclosure, as shown in FIG. 6, the method includes:

Step 601: the master telepresence terminal establishes a call between local side and a remote endpoint, a signaling processing module of the master telepresence terminal is responsible for signaling exchange, and implements media capability negotiation, establishes a media logical channel for transmitting media streams between the media transmission module of the master telepresence terminal and the remote endpoint, and records the media types and positions of the local audio input device and/or video input device.

Step 602: at least the audio input device or the video input device transmits captured audio and/or video data to the media encoding and decoding module of the telepresence terminal at corresponding position, each media encoding and decoding module encodes the inputted audio and/or video data respectively, and forwards the encoded media streams to the media transmission module of the master telepresence terminal.

It should be noted that, the media encoding and decoding module of the master telepresence terminal directly forwards the encoded media streams to the media transmission module of the master telepresence terminal, and a media encoding and decoding module of a secondary telepresence terminal forwards the encoded media streams to the media transmission module of the master telepresence terminal through corresponding media transmission module.

Step 603: the media transmission module of the master telepresence terminal transmits the encoded media streams through the media logical channel between the master telepresence terminal and the remote endpoint.

It should be noted that, when packing before transmitting, it is needed to identify corresponding media type and position information at header of the media package.

Embodiment 6

Figure 7:
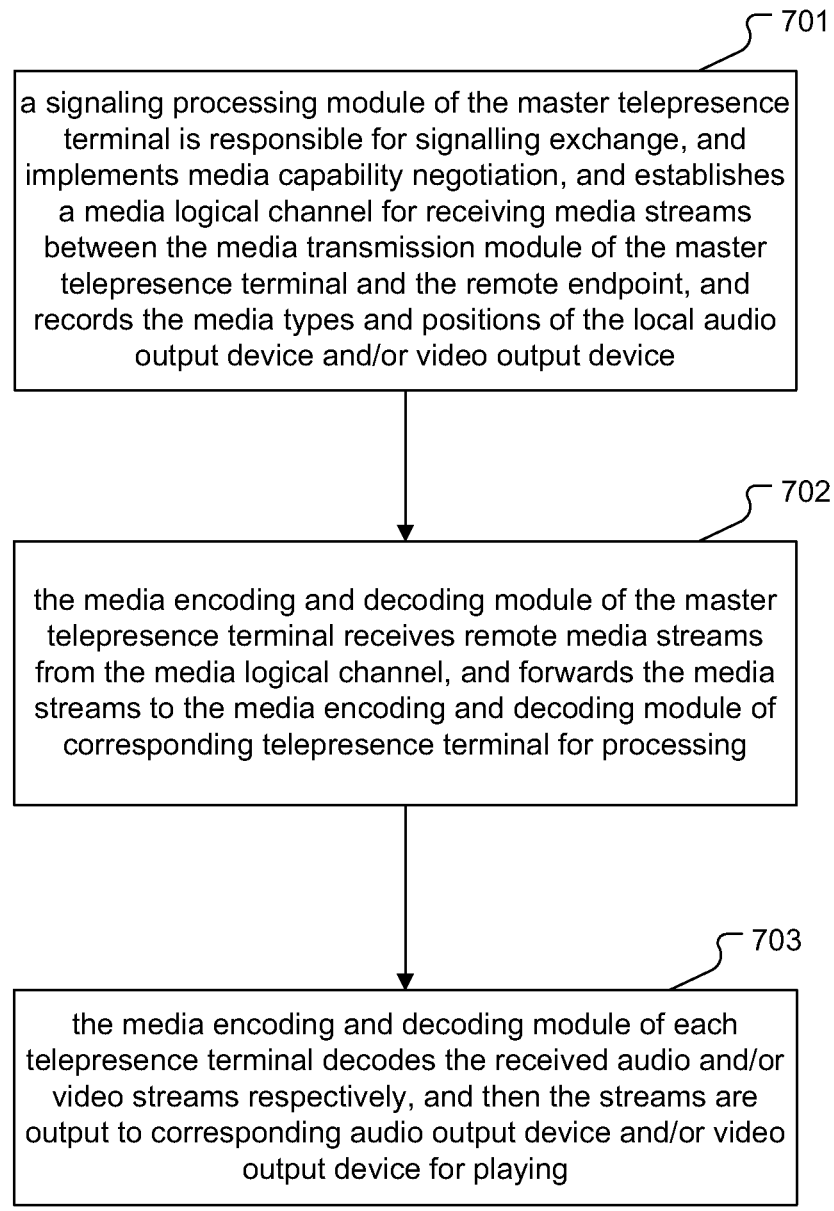
FIG. 7 is a schematic flow diagram illustrating that the media reception implemented by a media transmission system based on telepresence through a media logical channel according to embodiment 6 of the disclosure.

FIG. 7 is a schematic flow diagram illustrating the media reception implemented by a media transmission system based on telepresence through a media logical channel according to embodiment 6 of the disclosure, as shown in FIG. 7, the method includes:

Step 701: the master telepresence terminal establishes a call between local side and a remote endpoint, a signaling processing module of the master telepresence terminal is responsible for signaling exchange, and implements media capability negotiation, establishes a media logical channel for receiving media streams between the media transmission module of the master telepresence terminal and the remote endpoint, and records the media types and positions of the local audio output device and/or video output device.

Step 702: the media encoding and decoding module of the master telepresence terminal receives remote media streams from the media logical channel, and forwards the media streams to the media encoding and decoding module of corresponding telepresence terminal for processing.

In particular, the master telepresence terminal forwards the media streams to corresponding media encoding and decoding module for decoding by analyzing the media type and position information identified by the header of the media package. The media transmission module of the master telepresence terminal directly forwards the media streams to the media encoding and decoding module of the master telepresence terminal, and forwards the media streams to a media encoding and decoding module of a secondary telepresence terminal through the media transmission module of the secondary telepresence terminal.

Step 703: the media encoding and decoding module of each telepresence terminal decodes the received audio and/or video streams respectively, and then the streams are output to corresponding audio output device and/or video output device for playing.

Embodiment 7

In this embodiment, a media transmission system based on telepresence at least includes two or more telepresence terminals and a plurality of audio-video input/output devices, wherein one of the telepresence terminals (hereafter called "master telepresence terminal") is responsible for signaling and media agent, which at least includes a protocol signaling processing module, a media encoding and decoding module, a media transmission module; the other one or more telepresence terminals (hereafter called "secondary telepresence terminal") at least include a media encoding and decoding module and a media transmission module. One or more secondary telepresence terminals are respectively connected with the master telepresence terminal, the master telepresence terminal and the secondary telepresence terminal are respectively connected with at least one audio input device, at least one audio output device, at least one video input device and at least one video output device. The master telepresence terminal registers on a gatekeeper (GK) and provides a registered ID number of a endpoint to outsiders.

In this embodiment, the media logical channel established by the master telepresence terminal between the master telepresence terminal and the remote endpoint is established respectively between each telepresence terminal at local end and the remote endpoint, namely, using different addresses of each terminal at local end respectively, streams between the local telepresence terminal and the remote endpoint are processed directly by each telepresence terminal at local end respectively, the local master and secondary telepresence terminals respectively process corresponding media streams receiving and transmitting functions.

Figure 8:
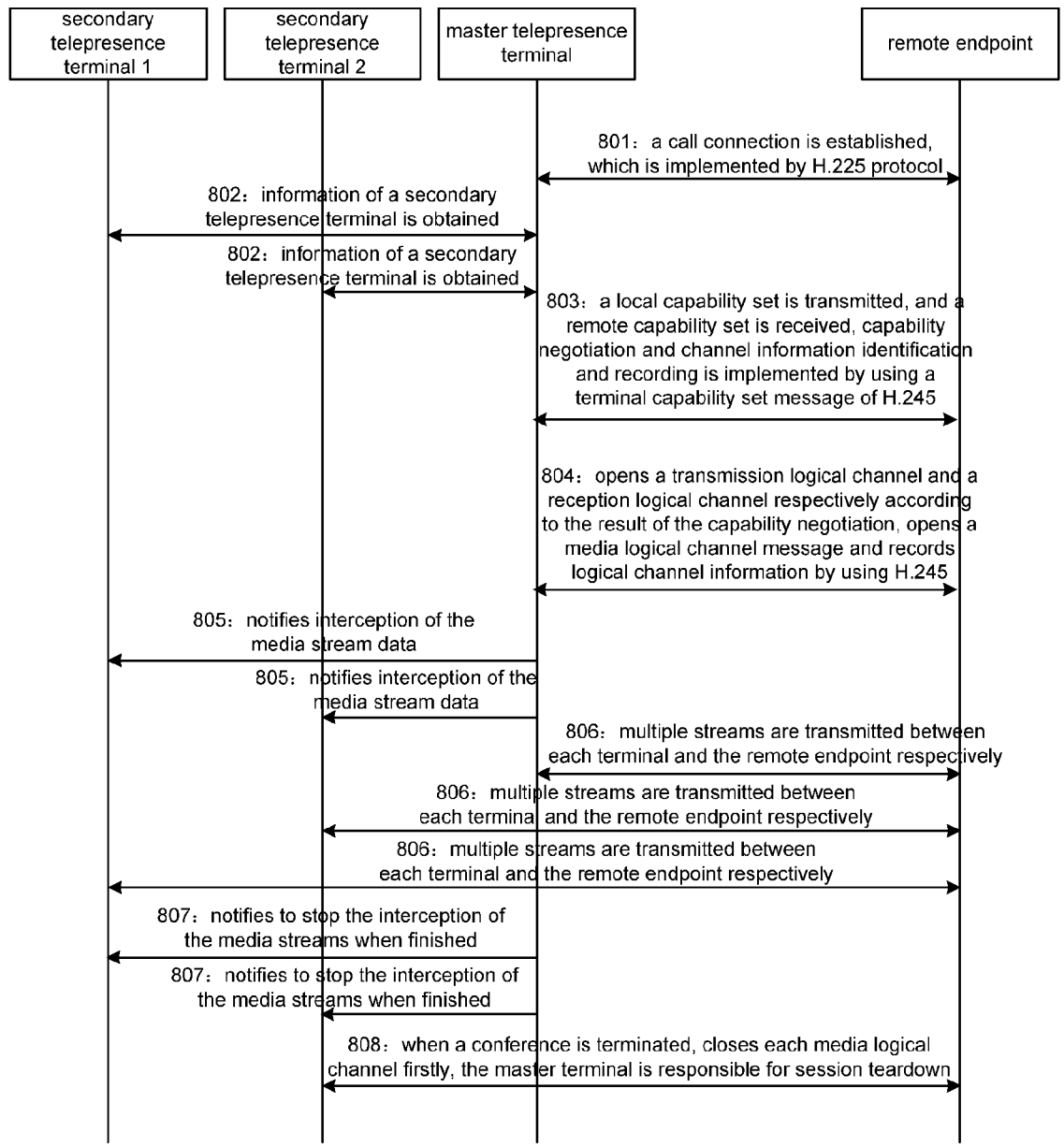
FIG. 8 is a schematic flow diagram of the media transmission method based on telepresence according to embodiment 7 of the disclosure.

FIG. 8 is a schematic flow diagram of a media transmission method based on telepresence according to embodiment 7 of the disclosure, as shown in FIG. 8, the method includes:

Step 801: a user initiates a call by connecting a central control interface or a remote controller of a master telepresence terminal, and by inputting a number of a called remote endpoint (such as IP address, or H.323 ID, or conference number, etc.), and the remote endpoint processes the call, and a connection is established. For example, a call connection is implemented by H.225 protocol, only the IP address or H.323 ID of the local master telepresence terminal needs to be used during a call.

Step 802: information of a secondary telepresence terminal is obtained by the master telepresence terminal, which including a media processing capability set and media reception and transmission addresses of each secondary telepresence terminal used in this call at local end.

Step 803: a media capability negotiation is implemented between the master telepresence terminal and the remote endpoint, which including: the master telepresence terminal implements an identification according to information of the secondary telepresence terminal and the master telepresence terminal and according to the positions of the terminals, constructs a capability set containing media type, quantity and position identification information of a channel which needs to be established for the remote endpoint, for example, a H.245 protocol can be employed, notifies an other side of the capability set and a capability description type supported by local end when transmitting the capability set, different streams at different positions are distinguished by the capability description type.

For example, in the terminalCapabilitySet message structure of H.245, descriptors of multiple audios and/or videos are added, and it is provisioned that different values correspond to different types and positions, for example, 1, 2, and 3 represent left, middle and right audio respectively, 4, 5, and 6 represent left, middle and right video respectively. The capability negotiation is implemented to determine media types and positions corresponding to each media logical channel by transmitting a local capability set and receiving a capability set transmitted by the remote endpoint via the terminalCapabilitySet, for example, media logical channel 1 corresponds to reception of the left audio of the remote endpoint, and channel 6 corresponds to reception of the right video of the remote endpoint.

Step 804: Opens a bidirectional media logical channel. A local master telepresence terminal transmits a H.245 openLogicalChannel message, the structure of which describes a corresponding relationship between the channel identification and the media type and position, as well as the feature description of the channel itself, at least includes media transmission addresses which use addresses (IP address and port number) of each terminal at local end respectively. The remote endpoint replies a openLogicalChannelAck message which at least includes a reception address (IP address and port number) of the channel, the local master telepresence terminal records a transmission channel information which includes a corresponding relationship between a channel identification and media type and position, a transmission and reception address, etc. Multiple transmission logical channels are established in the above-described manner respectively. The remote endpoint opens multiple media logical channels to local end in the above-described manner.

Step 805: The local master telepresence terminal informs a media transmission module of each telepresence terminal to transmit and receive media stream data through corresponding channel.

Step 806: each telepresence terminal at local end transfers multiple streams with the remote endpoint respectively. When the local end transmitting streams through different media logical channels, streams captured by an audio or video I/O device are transmitted to an encoding and decoding module of a terminal at corresponding position for encoding, then transmitted by corresponding media transmission module. When transmitting, the streams are transmitted through corresponding channel selected according to the position where the media source is and above-recorded media logical channel information, for example, the left audio is transmitted through channel 1.

When the local end receives streams through different media logical channels, media streams received by the media transmission module at the local end according to the media logical channel information recorded above, for example, the received left video, are forwarded to corresponding media encoding and decoding module for decoding, and output to the audio or video device at corresponding position for playing.

Step 807: When finished, the local master telepresence terminal informs media transmission modules of each telepresence terminal to stop the interception of the media streams.

Step 808: The master telepresence terminal is responsible for terminating a conference, including closing each media logical channel firstly, finally completing session teardown.

Embodiment 8

In this embodiment, each media logical channel is established between the master telepresence terminal and the remote endpoint, all the media streams are transmitted and received by the master telepresence terminal, and stream transfer between the master telepresence terminal and the secondary telepresence terminal is implemented by the master telepresence terminal.

Figure 9:
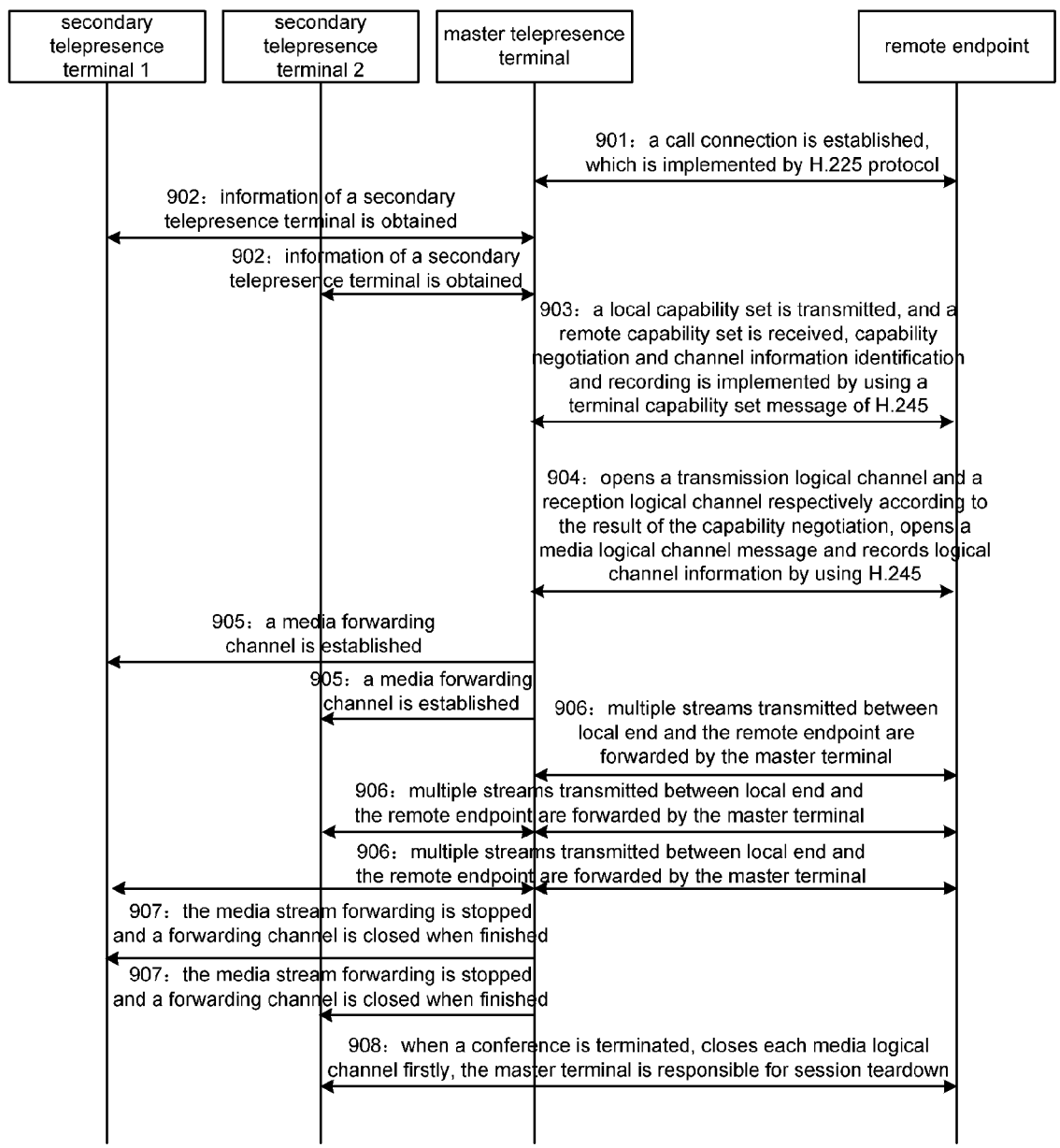
FIG. 9 is a schematic flow diagram of the media transmission method based on telepresence according to embodiment 8 of the disclosure.

FIG. 9 is a schematic flow diagram of a media transmission method based on telepresence according to embodiment 8 of the disclosure, as shown in FIG. 9, the method includes:

Step 901: a user initiates a call by connecting a central control interface or a remote controller of a master telepresence terminal, and by inputting a number of a called remote endpoint (such as IP address, or H.323 ID, or conference number, etc.), and the remote endpoint processes the call, and a connection is established. For example, a call connection is implemented by H.225 protocol, only the IP address or H.323 ID of the local master telepresence terminal needs to be used during a call.

Step 902: The master telepresence terminal obtains information of a secondary telepresence terminal, which including a media processing capability set and media reception and transmission addresses of each secondary telepresence terminal used in this call at local end (containing a IP address and port number).

Step 903: a media capability negotiation is implemented between the master telepresence terminal and the remote endpoint, which including: the master telepresence terminal implements an identification according to information of the secondary telepresence terminal and the master telepresence terminal and according to the positions of the terminals, constructs a capability set containing media type, quantity and position identification information of a channel which needs to be established for the remote endpoint, for example, a H.245 protocol can be employed, notifies an other side of the capability set and a capability description type supported by local end when transmitting the capability set, different streams at different positions are distinguished by the capability description type.

For example, in the terminalCapabilitySet message structure of H.245, descriptors of multiple audios and/or videos are added, and it is provisioned that different values correspond to different types and positions, for example, 1, 2, and 3 represent left, middle and right audio respectively, 4, 5, and 6 represent left, middle and right video respectively. The capability negotiation is implemented to determine media types and positions corresponding to each media logical channel by transmitting a local capability set and receiving a capability set transmitted by the remote endpoint via the terminalCapabilitySet, for example, media logical channel 1 corresponds to reception of the left audio of the remote endpoint, and channel 6 corresponds to reception of the right video of the remote endpoint.

Step 904: Opens a bidirectional media logical channel. The local master telepresence terminal transmits an openLogicalChannel message, an address of the local master telepresence terminal is used in the message to distinguish different channels, same IP addresses and different port numbers. The remote endpoint replies an openLogicalChannelAck message which at least includes a reception address of the channel (IP address and port number), the local master telepresence terminal records a transmission channel information which includes a corresponding relationship between a channel identification and media type and position, a transmission and reception address, etc. Multiple transmission logical channels are established in the above-described manner respectively. The remote endpoint opens multiple media logical channels to the local master telepresence terminal in the above-described manner.

Step 905: The local master telepresence terminal establishes media forwarding channels between the local master telepresence terminal and each secondary telepresence terminal, and maintains a mapping relationship between the forwarding channels between the master telepresence terminal and the secondary telepresence terminals and the transmission and reception channels between the master telepresence terminal and the remote endpoint.

Step 906: When the local end transmits streams through different media logical channels, the streams captured by the audio and/or video I/O devices are transmitted to the encoding and decoding modules of the terminals at corresponding positions for encoding, then forwarded to the master telepresence terminal through corresponding forwarding channel by a media transmission module of corresponding secondary telepresence terminal. The streams are transmitted by the master telepresence terminal through corresponding media logical channel recorded above between the master telepresence terminal and the remote endpoint according to the position where the media source is, for example, the left audio is transmitted through channel 1.

When the local end receives streams through different media logical channels, media streams received by the media transmission module of the local master telepresence terminal according to the media logical channel information recorded above, such as the received left video, are forwarded to the media encoding and decoding module of corresponding secondary telepresence terminal for decoding through above established corresponding forwarding channel between the master telepresence terminal and the secondary telepresence terminal, and output to the audio or video device at corresponding position for playing.

Step 907: When finished, the local master telepresence terminal informs media transmission modules of each terminal to stop the interception of the media streams and to close the forwarding channel between the secondary telepresence terminal and the master telepresence terminal.

Step 908: The master telepresence terminal is responsible for terminating a conference, including closing each media logical channel firstly, finally completing session teardown.

It should be noted that the connection established between the master telepresence terminal and the remote endpoint (which can be a MCU or a telepresence terminal) described in the disclosure can be a point-to-point conference or a multipoint conference, in particular, which is likely that the master telepresence terminal actively initiates a call, and also is likely that the master telepresence terminal accepts a call from the remote endpoint.

The embodiment of the disclosure further correspondingly proposes a media transmission system based on telepresence, the system includes a master telepresence terminal and at least one secondary telepresence terminal; wherein, the master telepresence terminal is configured to perform signaling exchange with the remote endpoint when establishing a connection between the media transmission system and the remote endpoint, establish a media logical channel between the media transmission system and the remote endpoint; and transmit the same type of media streams through an established media logical channel or respectively through multiple media logical channels, and receive the same type of media streams through an established media logical channel or respectively through multiple media logical channels;

the secondary telepresence terminal is configured to transmit and receive the media streams through the media logical channel established by the master telepresence terminal.

Figure 10:
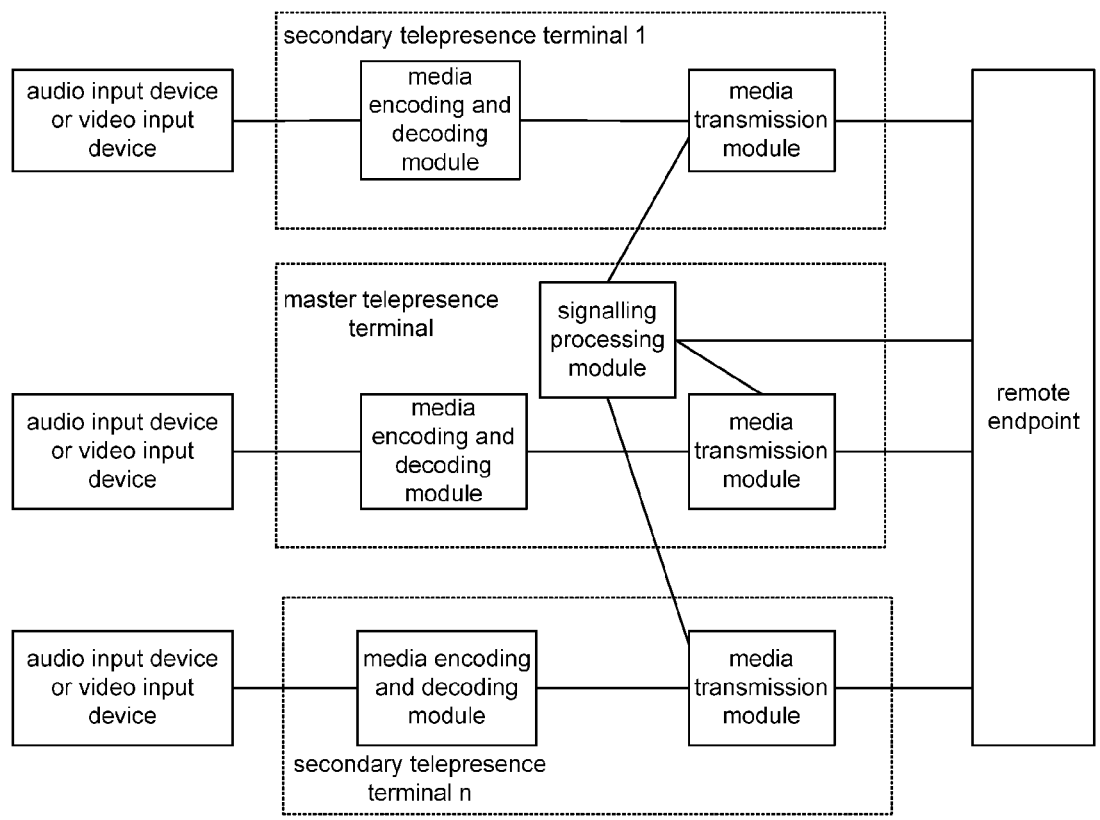
FIG. 10 is a schematic diagram of the structure of a media transmission system based on telepresence according to an embodiment of the disclosure.

FIG. 10 is a schematic diagram of the structure of a media transmission system based on telepresence according to an embodiment of the disclosure, as shown in FIG. 10, the system may further include a multiple audio input device and/or video input device, the master telepresence terminal at least includes: a signaling processing module, a media encoding and decoding module, a media transmission module, the secondary telepresence terminal at least includes: a media encoding and decoding module, and a media transmission module; wherein, the signaling processing module is configured to be responsible for signaling exchange and implementing media capability negotiation, respectively establish a media logical channel for transmitting media streams between the media transmission module of each telepresence terminal and the remote endpoint in the system, and record a information of correspondence between each media logical channel and position(s) of each audio input device and/or video input device;

at least the audio input device or video input device is configured to transmit captured audio and/or video data to the media encoding and decoding module of the telepresence terminal at corresponding position for encoding;

the media encoding and decoding module is configured to encode the inputted audio and/or video data and forwarding the encoded media streams to corresponding media transmission module;

the media transmission module is configured to transmit the media streams encoded by the media encoding and decoding module to the remote endpoint through a media logical channel corresponding to the type and position of the media source.

Figure 11:
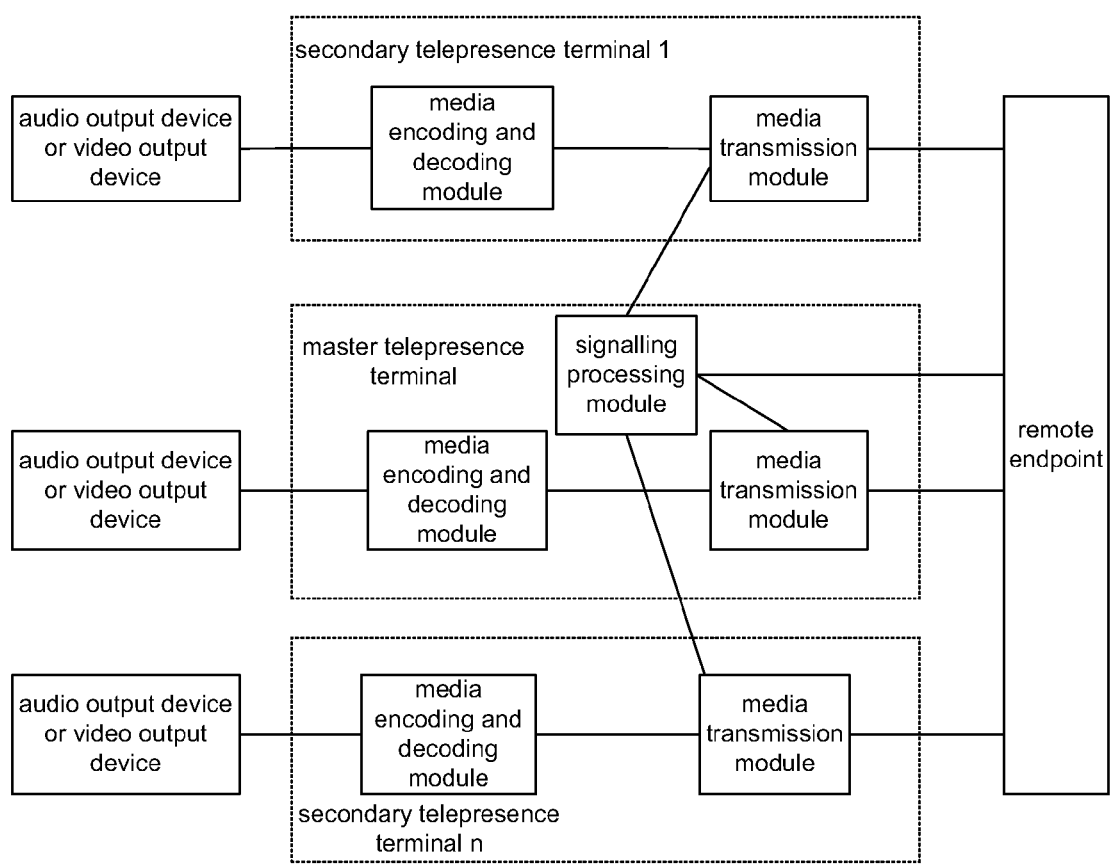
FIG. 11 is a schematic diagram of the structure of another media transmission system based on telepresence according to an embodiment of the disclosure.

FIG. 11 is a schematic diagram of the structure of another media transmission system based on telepresence according to an embodiment of the disclosure, as shown in FIG. 11, the system may further include a multiple audio output device and/or video output device, the master telepresence terminal at least includes: a signaling processing module, a media encoding and decoding module, a media transmission module, the secondary telepresence terminal at least includes: a media encoding and decoding module, and a media transmission module; wherein, the signaling processing module is configured to be responsible for signaling exchange and implementing media capability negotiation, respectively establish a media logical channel for receiving media streams between the media transmission module of each telepresence terminal and the remote endpoint in the system, and record a information of correspondence between each media logical channel and position(s) of each audio input device and/or video input device;

the media transmission module is configured to receive remote media streams through the established media logical channel, and respectively forward the media streams to corresponding media encoding and decoding module for processing according to information of correspondence between each media logical channel and position(s) of each audio input device and/or video input device;

the media encoding and decoding module is configured to decode the received media streams and then output the media streams to corresponding audio output device and/or video output device for playing.

Figure 12:
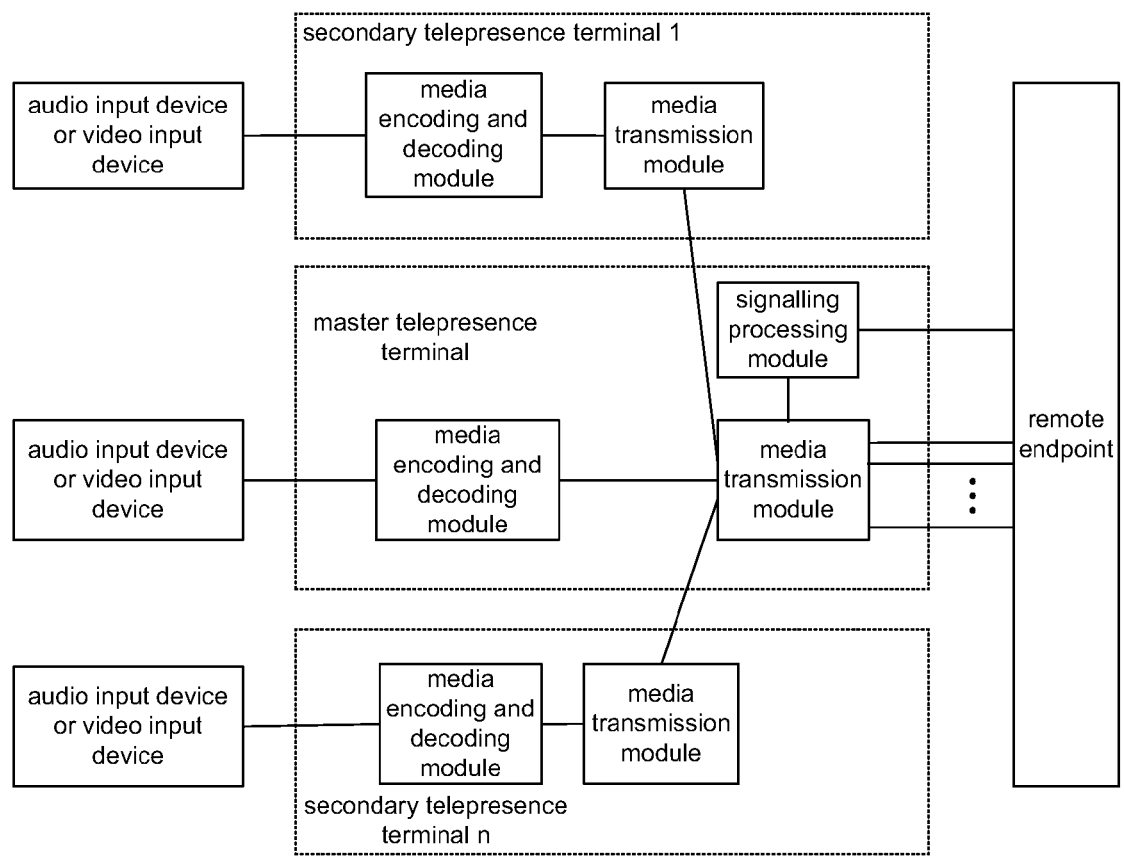
FIG. 12 is a schematic diagram of the structure of yet another media transmission system based on telepresence according to an embodiment of the disclosure.

FIG. 12 is a schematic diagram of the structure of yet another media transmission system based on telepresence according to an embodiment of the disclosure, as shown in FIG. 12, the system further includes a multiple audio input device and/or video input device, the master telepresence terminal at least includes: a signaling processing module, a media encoding and decoding module, a media transmission module, the secondary telepresence terminal at least includes: a media encoding and decoding module, and a media transmission module; wherein, the signaling processing module is configured to be responsible for signaling exchange and implementing media capability negotiation, establish multiple media logical channels for transmitting media streams between the media transmission module of the master telepresence terminal and the remote endpoint, record information of correspondence between each media logical channel and position(s) of each audio input device and/or video input device;

at least the audio input device or video input device is configured to transmit captured audio and/or video data to the media encoding and decoding module of the telepresence terminal at corresponding position;

the media encoding and decoding module is configured to encode the inputted audio and/or video data and forward encoded media streams to the media transmission module of the master telepresence terminal, wherein a media encoding and decoding modules of a secondary telepresence terminal forwards the encoded media streams to the media transmission module of the master telepresence terminal by corresponding media transmission module, the media encoding and decoding module of the master telepresence terminal directly forwards the encoded media streams to the media transmission module of the master telepresence terminal;

the media transmission module of the master telepresence terminal is configured to respectively transmit the media streams encoded by each media encoding and decoding module in the system to the remote endpoint through the media logical channel corresponding to the type and position of the media source.

Figure 13:
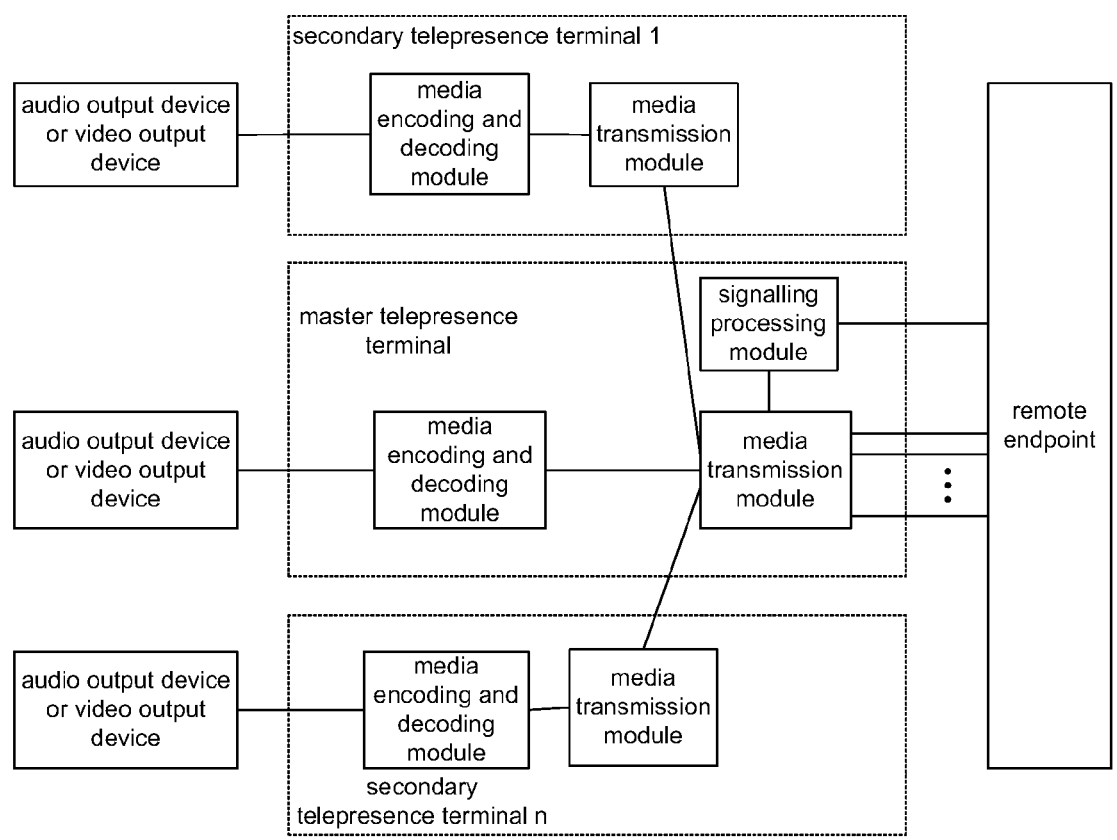
FIG. 13 is a schematic diagram of the structure of still another media transmission system based on telepresence according to an embodiment of the disclosure.

FIG. 13 is a schematic diagram of the structure of still another media transmission system based on telepresence according to an embodiment of the disclosure, as shown in FIG. 13, the system further includes a multiple audio output device and/or video output device, the master telepresence terminal at least includes: a signaling processing module, a media encoding and decoding module, a media transmission module, the secondary telepresence terminal at least includes: a media encoding and decoding module, and a media transmission module; wherein, the signaling processing module is configured to be responsible for signaling exchange and implementing media capability negotiation, establish multiple media logical channels for receiving media streams between the media transmission module of the master telepresence terminal and the remote endpoint, record information of correspondence between each media logical channel and position(s) of each audio input device and/or video input device;

the media transmission module of the master telepresence terminal is configured to respectively receive multiple remote media streams through each established media logical channel, and respectively forward the received media streams to the media encoding and decoding module of corresponding telepresence terminal for processing according to a correspondence relationship between each media logical channel and a position of each audio input device or video input device, wherein the media streams are forwarded directly to the media encoding and decoding module of the master telepresence terminal, and forwarded to a media encoding and decoding module of a secondary telepresence terminal through corresponding media transmission module;

the media encoding and decoding module is configured to decode the received audio and/or video streams and then output the streams to corresponding audio output device and/or video output device for playing.

Figure 14:
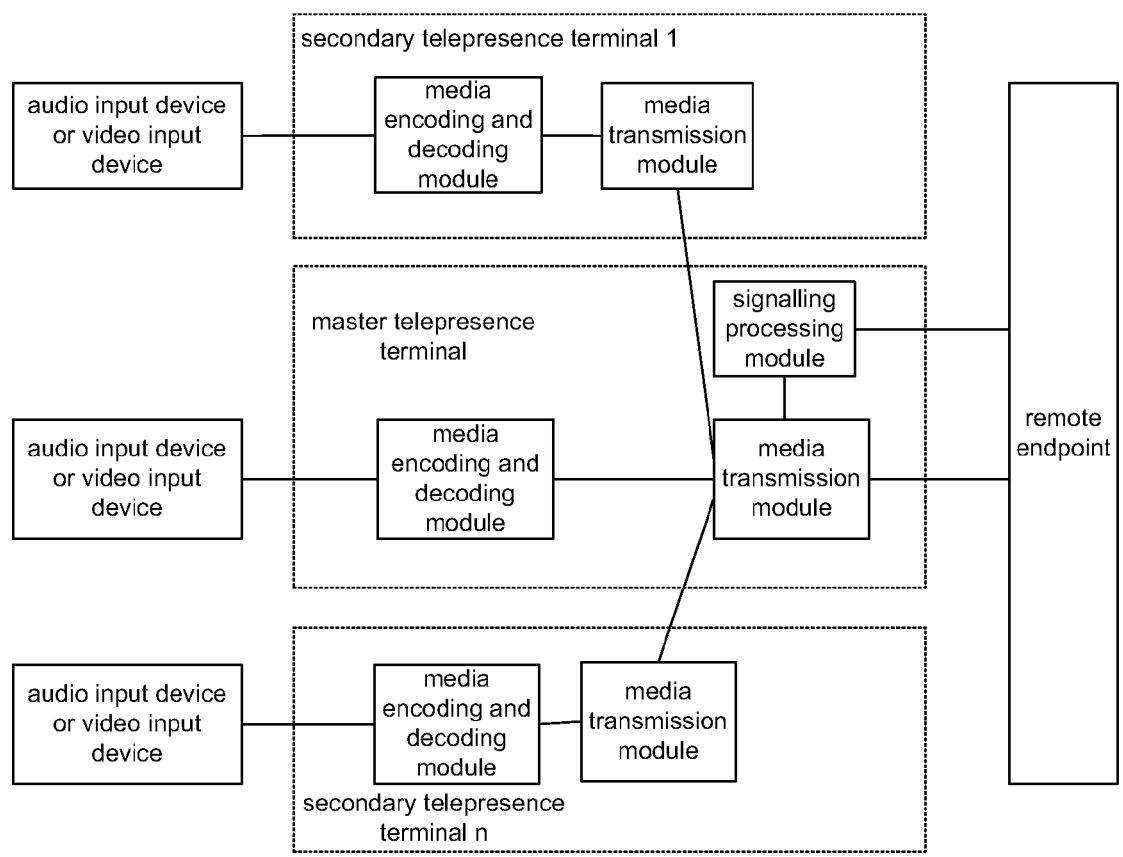
FIG. 14 is a schematic diagram of the structure of still another media transmission system based on telepresence according to an embodiment of the disclosure.

FIG. 14 is a schematic diagram of the structure of still another media transmission system based on telepresence according to an embodiment of the disclosure, as shown in FIG. 14, the system further includes a multiple audio input device and/or video input device, the master telepresence terminal at least includes: a signaling processing module, a media encoding and decoding module, a media transmission module, the secondary telepresence terminal at least includes: a media encoding and decoding module, and a media transmission module; wherein, the signaling processing module is configured to be responsible for the signaling exchange and implementing media capability negotiation, establish a media logical channel for transmitting media streams between the media transmission module of the master telepresence terminal and the remote endpoint for each media type, record media types and positions of a local audio input device and/or video input device;

at least the audio input device or video input device is configured to transmit captured audio and/or video data to the media encoding and decoding module of the telepresence terminal at corresponding position;

the media encoding and decoding module is configured to encode the inputted audio and/or video data, the media encoding and decoding module of the master telepresence terminal forwards the encoded media streams to corresponding media transmission module, the media encoding and decoding module of the secondary telepresence terminal forwards the encoded media streams to the media transmission module of the master telepresence terminal through corresponding media transmission module;

the media transmission module of the master telepresence terminal is configured to transmit the received encoded media streams through the media logical channel between the master telepresence terminal and the remote endpoint, corresponding media type and position information are included in header of a transmitted media package.

Figure 15:
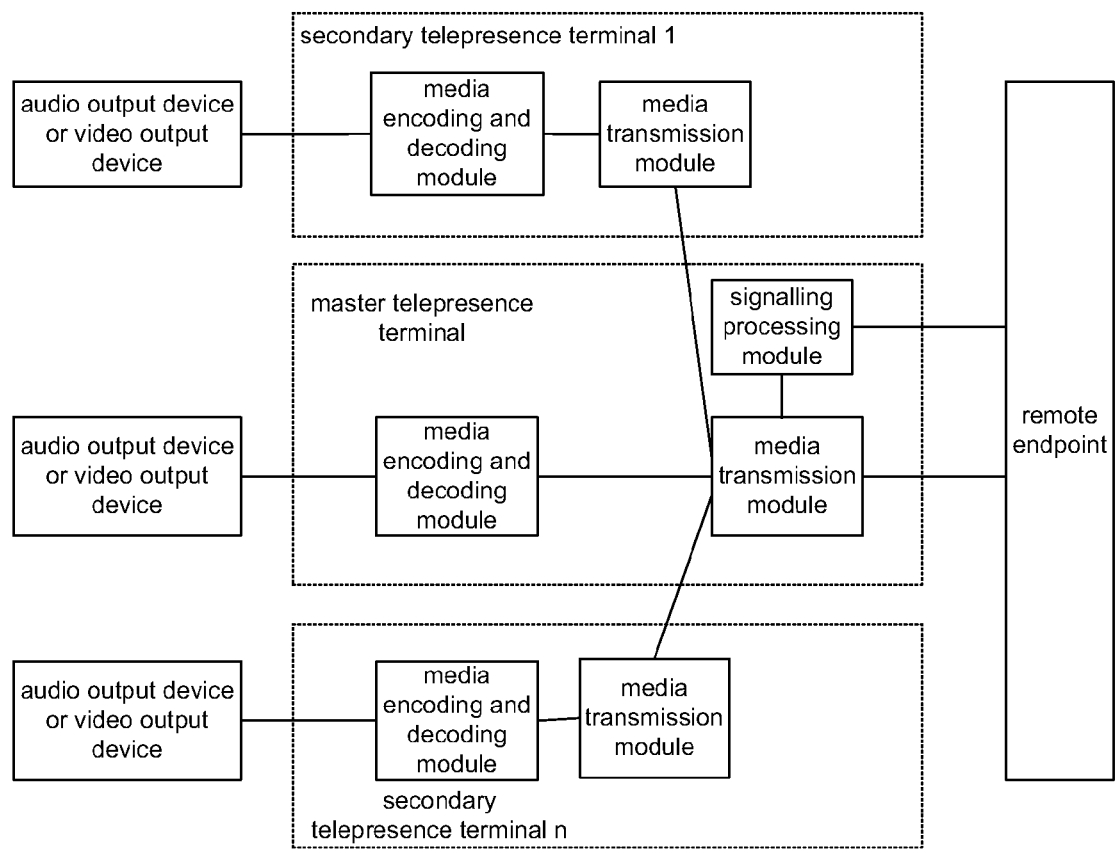
FIG. 15 is a schematic diagram of the structure of still another media transmission system based on telepresence according to an embodiment of the disclosure.

FIG. 15 is a schematic diagram of the structure of still another media transmission system based on telepresence according to an embodiment of the disclosure, as shown in FIG. 15, the system further includes a multiple audio output device and/or video output device, the master telepresence terminal at least includes: a signaling processing module, a media encoding and decoding module, a media transmission module, the secondary telepresence terminal at least includes: a media encoding and decoding module, and a media transmission module; wherein, the signaling processing module is configured to be responsible for signaling exchange and implementing media capability negotiation, establish a media logical channel for receiving between the media transmission module of the master telepresence terminal and the remote endpoint for each media type, record media types and positions of a local audio output device and/or video output device;

the media transmission module of the master telepresence terminal is configured to receive remote media streams from the media logical channel, forward the media streams to the media encoding and decoding module of corresponding telepresence terminal for processing by analyzing the media type and position information identified by a header, wherein the media streams are forwarded directly to the media encoding and decoding module of the master telepresence terminal, and forwarded to the media encoding and decoding module of the secondary telepresence terminal by corresponding media transmission module;

the media encoding and decoding module is configured to decode received audio and/or video streams and then output the streams to corresponding audio output device and/or video output device for playing.

In the disclosure, different media logical channels can be distinguished by IP addresses and port numbers, IP addresses and/or port numbers to which different media logical channels correspond are different.

The embodiments described above are only the preferred embodiments of the disclosure, and are not intended to limit the scope of the disclosure.

The invention claimed is:

1. A media transmission method based on telepresence, wherein a media transmission system comprises a master telepresence terminal and at least one secondary telepresence terminal, the method comprises:

during connection establishment, performing signaling exchange by a master telepresence terminal of a local media transmission system and a remote endpoint, to establish media logical channels between the local media transmission system and the remote endpoint;

the local media transmission system transmitting the same type of media streams to the remote endpoint through a media logical channel or respectively through multiple media logical channels, and receiving the same type of media streams through a media logical channel or respectively through multiple media logical channels from the remote endpoint;

wherein the media logical channel is distinguished by an IP address and a port number, at least IP addresses or port numbers to which different media logical channels correspond are different.

2. The method according to claim 1, wherein, the establishing media logical channel between the local media transmission system and the remote endpoint is: respectively establishing media logical channels for transmitting media streams between media transmission modules of each local telepresence terminal and the remote endpoint, and recording information of correspondence between each media logical channel and position(s) of each audio input device and/or video input device;

the transmitting the same type of media streams respectively through multiple media logical channels from the local media transmission system to the remote endpoint is: transmitting, by at least the audio input device or video input device, at least captured audio or video data to the media encoding and decoding module of the telepresence terminal at corresponding position for encoding; respectively encoding, by the media encoding and decoding module of each telepresnece terminal, at least inputted audio or video data, and forwarding the encoded media streams to corresponding media transmission module; respectively transmitting, by the media transmission module of each telepresence terminal, the encoded media streams to the remote endpoint through the media logical channel corresponding to the type and position of a media source.

3. The method according to claim 1, wherein, the establishing a media logical channel between the local media transmission system and the remote endpoint is: respectively establishing media logical channels for receiving media streams between the media transmission module of each local telepresence terminal and the remote endpoint, and recording information of correspondence between each media logical channel and position(s) of each audio input device and/or video input device;

the receiving the same type of media streams by the local media transmission system from the remote endpoint respectively through multiple media logical channels is: respectively receiving, by the media transmission module of each telepresence terminal, remote multiple media streams through the established media logical channel, and respectively forwarding the media streams to corresponding media encoding and decoding modules for processing according to a correspondence relationship between each media logical channel and a position of each audio input device or video input device; respectively decoding, by the media encoding and decoding module of each telepresence terminal, the received media streams, and then outputting the media streams to at least corresponding audio output device or video output device for playing.

4. The method according to claim 1, wherein,
the establishing a media logical channel between the local media transmission system and the remote endpoint is: establishing multiple media logical channels for transmitting media streams between the media transmission module of the master telepresence terminal and the remote endpoint, and recording information of correspondence between each media logical channel and position(s) of each audio input device and/or video input device;
the transmitting the same type of media streams between the local media transmission system and the remote endpoint respectively through multiple media logical channels is: transmitting, by at least the audio input device or video input device, at least captured audio or video data to the media encoding and decoding module of the telepresence terminal at corresponding position; encoding, by each media encoding and decoding module, at least inputted audio or video data respectively, and forwarding the encoded media streams to the media transmission module of the master telepresence terminal; respectively transmitting, by the media transmission module of the master telepresence terminal, the media streams encoded by the local media encoding and decoding module to the remote endpoint through the media logical channel corresponding to the type and position of a media source.

5. The method according to claim 1, wherein,
the establishing a media logical channel between the local media transmission system and the remote endpoint is: establishing multiple media logical channels for receiving media streams between the media transmission module of the master telepresence terminal and the remote endpoint, and recording information of correspondence between each media logical channel and position(s) of each audio input device and/or video input device;
the receiving the same type of media streams between the local media transmission system and the remote endpoint respectively through multiple media logical channels is: receiving, by the media transmission module of the master telepresence terminal, remote multiple media streams respectively through each established media logical channel, and respectively forwarding the received media streams to the media encoding and decoding module of corresponding telepresence terminal for processing according to a correspondence relationship between each media logical channel and a position of each audio input device or video input device; decoding, by the media encoding and decoding module of each telepresence terminal, at least the received audio or video streams respectively, and then outputting the streams to at least corresponding audio output device or video output device for playing.

6. The method according to claim 1, wherein,
the establishing a media logical channel between the local media transmission system and the remote endpoint is: establishing a media logical channel for transmitting media streams for each media type between the media transmission module of the master telepresence terminal and the remote endpoint, and recording media types and positions of at least the local audio input device or the video input device;
the transmitting the same type of media streams between the local media transmission system and the remote endpoint through a media logical channel is: transmitting, by at least the audio input device or video input device, at least captured audio or video data to the media encoding and decoding module of the telepresence terminal at corresponding position; encoding, by each media encoding and decoding module, at least inputted audio or video data respectively, and forwarding the encoded media streams to the media transmission module of the master telepresence terminal; transmitting, by the media transmission module of the master telepresence terminal, the encoded media streams through the media logical channel between the master telepresence terminal and the remote endpoint, corresponding media type and position information are comprised in a header of a media package transmitted.

7. The method according to claim 1, wherein,
the establishing a media logical channel between the local media transmission system and the remote endpoint is: establishing a media logical channel for receiving media streams for each media type between the media transmission module of the master telepresence terminal and the remote endpoint, and recording media types and positions of at least a local audio output device or video output device;
the receiving the same type of media streams between the local media transmission system and the remote endpoint through a media logical channel is: receiving, by the media transmission module of the master telepresence terminal, the remote media streams from the media logical channel, and forwarding the media streams to the media encoding and decoding module of corresponding telepresence terminal for processing by analyzing the media type and position information identified by the header of a package; decoding, by the media encoding and decoding module of each telepresence terminal, at least the received audio or video streams respectively, and then outputting the streams to at least corresponding audio output device or video output device for playing.

8. A media transmission system based on telepresence, wherein the system comprises a master telepresence terminal and at least one secondary telepresence terminals; wherein,
the master telepresence terminal is configured to, during connection establishment between the media transmission system and a remote endpoint, perform signaling exchange with the remote endpoint, to establish media logical channels between the media transmission system and the remote endpoint; and transmit the same type of media streams through an established media logical channel or respectively through multiple media logical channels, and receive the same type of media streams through an established media logical channel or respectively through multiple media logical channels;
the secondary telepresence terminal is configured to transmit and receive media streams through the media logical channel established by the master telepresnece terminal;
wherein the media logical channel is distinguished by an IP address and a port number, at least IP addresses or port numbers to which different media logical channels correspond are different.

9. The system according to claim 8, wherein the system further comprises at least a multi audio input device or video input device, the master telepresence terminal at least comprises: a signalling processing module, a media encoding and decoding module, a media transmission module, the secondary telepresence terminal at least comprises: a media encoding and decoding module, and a media transmission module; wherein, the signaling processing module is configured to be responsible for signalling exchange and implementing media capability negotiation, to respectively establish the media logical channel for transmitting media streams between the media transmission module of each telepresence terminal and the remote endpoint in the system, and record information of correspondence between each media logical channel and position(s) of each audio input device and/or video input device;

at least the audio input device or the video input device is configured to transmit at least captured audio or video data to the media encoding and decoding module of the telepresence terminal at corresponding position for encoding;

the media encoding and decoding module is configured to encode at least the inputted audio or video data, and forward the encoded media streams to corresponding media transmission module;

the media transmission module is configured to transmit the media streams encoded by the media encoding and decoding module to the remote endpoint through the media logical channel corresponding to the type and position of a media source.

10. The system according to claim 8, wherein the system further comprises at least a multi audio output device or video output device, the master telepresence terminal at least comprises: a signalling processing module, a media encoding and decoding module, a media transmission module, the secondary telepresence terminal at least comprises: a media encoding and decoding module, and a media transmission module; wherein, the signaling processing module is configured to be responsible for signalling exchange and implementing media capability negotiation, to respectively establish the media logical channel for receiving media streams between the media transmission module of each telepresence terminal and the remote endpoint in the system, and record information of correspondence between each media logical channel and position(s) of each audio input device and/or video input device;

the media transmission module is configured to receive remote media streams through the established media logical channel, and respectively forward the media streams to corresponding media encoding and decoding module for processing according to information of correspondence between each media logical channel and a position of each audio input device or video input device;

the media encoding and decoding module is configured to decode the received media streams, then output the media streams to at least corresponding audio output device or video output device for playing.

11. The system according to claim 8, wherein the system further comprises a multiple audio input device and/or video input device, the master telepresence terminal at least comprises: a signalling processing module, a media encoding and decoding module, a media transmission module, the secondary telepresence terminal at least comprises: a media encoding and decoding module, and a media transmission module; wherein, the signalling processing module is configured to be responsible for signalling exchange and implementing media capability negotiation, to establish multiple media logical channels for transmitting media streams between the media transmission module of the master telepresence terminal and the remote endpoint, and record information of correspondence between each media logical channel and position(s) of each audio input device and/or video input device;

at least the audio input device or video input device is configured to transmit at least captured audio or video data to the media encoding and decoding module of the telepresence terminal at corresponding position;

the media encoding and decoding module is configured to encode at least the inputted audio or video data, and forward the encoded media streams to the media transmission module of the master telepresence terminal, wherein the media encoding and decoding module of the secondary telepresence terminal forwards the encoded media streams to the media transmission module of the master telepresence terminal through corresponding media transmission module, the media encoding and decoding module of the master telepresence terminal forwards the encoded media streams directly to the media transmission module of the master telepresence terminal;

the media transmission module of the master telepresence terminal is configured to respectively transmit media streams encoded by each media encoding and decoding module in the system to the remote endpoint through the media logical channel corresponding to the type and position of a media source.

12. The system according to claim 8, wherein the system further comprises at least a multiple audio output device or video output device, the master telepresence terminal at least comprises: a signalling processing module, a media encoding and decoding module, a media transmission module, the secondary telepresence terminal at least comprises: a media encoding and decoding module, and a media transmission module; wherein, the signaling processing module is configured to be responsible for signalling exchange and implementing media capability negotiation, to establish multiple media logical channels for receiving media streams between the media transmission module of the master telepresence terminal and the remote endpoint, and record corresponding information of each media logical channel and positions of at least the audio output device or the video output device;

the media transmission module of the master telepresence terminal is configured to respectively receive remote multiple media streams through each established media logical channel, and respectively forward the received media streams to the media encoding and decoding module of corresponding telepresence terminal for processing according to a correspondence relationship between each media logical channel and a position of each audio input device or video input device, wherein the media streams are forwarded directly to the media encoding and decoding module of the master telepresence terminal, and forwarded to the media encoding and decoding module of the secondary telepresence terminal by corresponding media transmission module;

the media encoding and decoding module is configured to decode at least the received audio or video streams, and then output the streams to at least corresponding audio output device or video output device for playing.

13. The system according to claim 8, wherein the system further comprises at least a multiple audio input device or video input device, the master telepresence terminal at least comprises: a signalling processing module, a media encoding and decoding module, a media transmission module, the secondary telepresence terminal at least comprises: a media encoding and decoding module, and a media transmission module; wherein, the signaling processing module is configured to be responsible for signalling exchange and implementing media capability negotiation, to establish a media logical channel for transmitting media streams for each media type between the media transmission module of the master telepresence terminal and the remote endpoint, and record media types and positions of at least the local audio input device or video input device;

at least the audio input device or video input device is configured to transmit at least captured audio or video data to the media encoding and decoding module of the telepresence terminal at corresponding position;

the media encoding and decoding module is configured to encode at least inputted audio or video data, the media encoding and decoding module of the master telepresence terminal forwards the encoded media streams to corresponding media transmission module, the media encoding and decoding module of the secondary telepresence terminal forwards the encoded media streams to the media transmission module of the master telepresence terminal by corresponding media transmission module;

the terminal transmission module of the master telepresence terminal is configured to transmit the received encoded media streams through the media logical channel between the master telepresence terminal and the remote endpoint, corresponding media type and position information are included in a header of a media package transmitted.

14. The system according to claim 8, wherein the system further comprises at least a multiple audio output device or video output device, the master telepresence terminal at least comprises: a signalling processing module, a media encoding and decoding module, a media transmission module, the secondary telepresence terminal at least comprises: a media encoding and decoding module, and a media transmission module; wherein, the signaling processing module is configured to be responsible for signalling exchange and implementing media capability negotiation, to establish a media logical channel for receiving for each media type between the media transmission module of the master telepresence terminal and the remote endpoint, and record media types and positions of at least the local audio output device or video output device;

the media transmission module of the master telepresence terminal is configured to receive remote media streams from the media logical channel, forward the media streams to the media encoding and decoding module of corresponding telepresence terminal for processing by analyzing the media type and position information identified by a header, wherein the media streams are forwarded directly to the media encoding and decoding module of the master telepresence terminal, and forwarded to the media encoding and decoding module of the secondary telepresence terminal by corresponding media transmission module;

the media encoding and decoding module is configured to decode at least received audio or video streams, and then output the streams to at least corresponding audio output device or video output device for playing.

* * * * *